US012275599B2

(12) United States Patent
Itoh et al.

(10) Patent No.: US 12,275,599 B2
(45) Date of Patent: Apr. 15, 2025

(54) CONVEYOR SYSTEM, CAUSE INFORMATION REPORT DEVICE, AND COMPUTER-READABLE RECORDING MEDIUM RECORDING PROGRAM FOR CAUSE INFORMATION REPORT DEVICE

(71) Applicant: Itoh Denki Co., Ltd., Kasai (JP)

(72) Inventors: Kazuo Itoh, Kasai (JP); Toshiyuki Tachibana, Himeji (JP); Tomoya Matoba, Kasai (JP)

(73) Assignee: ITOH DENKI CO., LTD., Kasai (JP)

( * ) Notice: Subject to any disclaimer, the term of this patent is extended or adjusted under 35 U.S.C. 154(b) by 864 days.

(21) Appl. No.: 17/492,703

(22) Filed: Oct. 4, 2021

(65) Prior Publication Data

US 2022/0024697 A1    Jan. 27, 2022

Related U.S. Application Data

(63) Continuation-in-part of application No. PCT/JP2020/013075, filed on Mar. 24, 2020.

(30) Foreign Application Priority Data

Apr. 5, 2019    (JP) .................................. 2019-073018

(51) Int. Cl.
*B65G 43/08*    (2006.01)
*B65G 43/10*    (2006.01)
(Continued)

(52) U.S. Cl.
CPC ............. *B65G 43/08* (2013.01); *B65G 43/10* (2013.01); *G05B 19/4189* (2013.01);
(Continued)

(58) Field of Classification Search
CPC .... B65G 43/08; B65G 43/10; B65G 19/4189; B65G 23/0272; B65G 2203/042; B65G 47/54; G05B 2219/2621; H02P 29/024
See application file for complete search history.

(56) References Cited

U.S. PATENT DOCUMENTS

| 5,293,322 A | 3/1994 | Yagi et al. |
| 5,460,257 A | 10/1995 | Yoshida |

(Continued)

FOREIGN PATENT DOCUMENTS

| AU | 634261 B2 | 2/1993 |
| DE | 102010037601 A1 | 4/2011 |

(Continued)

OTHER PUBLICATIONS

Applicant brings to the attention of the Examiner the existence of U.S. Appl. No. 14/386,180, filed Mar. 11, 2013, published as US 2015 068871 A1 on Mar. 12, 2015, and issued as U.S. Pat. No. 9,446,907 B2 on Sep. 20, 2016, which was the national stage of PCT/JP2013/056692 filed on Mar. 11, 2013 and published as WO 2013 141066 A1 on Sep. 26, 2013, and which has overlapping inventorship/ownership with the present case.

(Continued)

*Primary Examiner* — Michael Collins
(74) *Attorney, Agent, or Firm* — Kratz, Quintos & Hanson, LLP

(57)    ABSTRACT

Conveyer device including a local controller provided in each zone for controlling a transport operation of the zone, and host controller that reports information relating to a cause of non-transport are included. Host controller includes mouse and the like for receiving, from a user, a selection instruction through which one of a plurality of zones is selected, and report processor that obtains, as clue information, information relating to a phenomenon that can be the cause of the non-transport of a conveyed object, from local (Continued)

controller of the target zone, and reports cause information corresponding to information relating to the cause based on the clue information, when the clue information satisfies a determination condition previously set.

15 Claims, 19 Drawing Sheets

(51) Int. Cl.
  *G05B 19/418* (2006.01)
  *G05B 23/02* (2006.01)
(52) U.S. Cl.
  CPC .... *G05B 23/0272* (2013.01); *B65G 2203/042* (2013.01); *G05B 2219/2621* (2013.01)

(56) References Cited

U.S. PATENT DOCUMENTS

| | | | |
|---|---|---|---|
| 6,021,888 A | 2/2000 | Itoh et al. | |
| 6,705,526 B1 | 3/2004 | Zhu | |
| 6,820,736 B2 | 11/2004 | Itoh et al. | |
| 6,827,202 B2 | 12/2004 | Topmiller | |
| 6,843,362 B2 | 1/2005 | Tachibana et al. | |
| 6,873,882 B2 | 3/2005 | Tachibana et al. | |
| 7,026,732 B1 | 4/2006 | Backman | |
| 7,344,082 B2* | 3/2008 | Zhu | G06K 7/14 235/462.14 |
| 7,542,823 B2 | 6/2009 | Nagai | |
| 7,591,365 B2 | 9/2009 | Knepple | |
| 7,996,104 B2 | 8/2011 | Wielebski | |
| 8,042,681 B2 | 10/2011 | Chuang | |
| 8,186,499 B2 | 5/2012 | Brandt | |
| 8,396,587 B2 | 3/2013 | Saitou | |
| 8,499,920 B2 | 8/2013 | Ogawa | |
| 8,550,234 B2 | 10/2013 | Breen | |
| 8,757,363 B2 | 6/2014 | Combs | |
| 8,763,788 B2 | 7/2014 | Neiser | |
| 8,887,897 B2 | 11/2014 | Itoh et al. | |
| 9,037,290 B2 | 5/2015 | Neiser | |
| 9,446,907 B2 | 9/2016 | Tachibana et al. | |
| 9,446,908 B2 | 9/2016 | Danelski | |
| 9,555,978 B1 | 1/2017 | Hanssen et al. | |
| 9,617,083 B2 | 4/2017 | Itoh et al. | |
| 2003/0115408 A1 | 6/2003 | Topmiller et al. | |
| 2003/0135299 A1 | 7/2003 | Tachibana et al. | |
| 2003/0168316 A1 | 9/2003 | Knepple et al. | |
| 2003/0209410 A1 | 11/2003 | Itoh et al. | |
| 2004/0003982 A1 | 1/2004 | Tachibana et al. | |
| 2004/0166911 A1 | 8/2004 | Chen | |
| 2004/0182684 A1 | 9/2004 | Guidetti | |
| 2005/0262363 A1 | 11/2005 | Claseman | |
| 2006/0058915 A1* | 3/2006 | Sheehan | G05B 19/4182 700/224 |
| 2009/0099686 A1 | 4/2009 | Yoshikawa et al. | |
| 2012/0004766 A1 | 1/2012 | Stoll et al. | |
| 2012/0048682 A1 | 3/2012 | Itoh et al. | |
| 2012/0323358 A1 | 12/2012 | Izumi et al. | |
| 2014/0305227 A1 | 10/2014 | Johns | |
| 2014/0330430 A1 | 11/2014 | Waller et al. | |
| 2015/0068871 A1 | 3/2015 | Tachibana et al. | |
| 2015/0210484 A1 | 7/2015 | Itoh et al. | |
| 2017/0101273 A1 | 4/2017 | Itoh et al. | |
| 2018/0327191 A1 | 11/2018 | Nagatani et al. | |
| 2020/0299068 A1 | 9/2020 | Hampe et al. | |
| 2021/0078745 A1* | 3/2021 | Gartmann | B29C 66/4312 |

FOREIGN PATENT DOCUMENTS

| | | | |
|---|---|---|---|
| EP | 2159655 A2 | 3/2010 | |
| EP | 2829496 A1 | 1/2015 | |
| JP | S55-101505 A | 8/1980 | |
| JP | 1986-229753 A | 10/1986 | |
| JP | H2-193808 A | 7/1990 | |
| JP | H5-77915 A | 3/1993 | |
| JP | H6-293426 A | 10/1994 | |
| JP | 1995-041139 A | 2/1995 | |
| JP | H7-285661 A | 10/1995 | |
| JP | 2001-240231 A | 9/2001 | |
| JP | 2002-012315 A | 1/2002 | |
| JP | 2002-370828 A | 12/2002 | |
| JP | 2005-231745 A | 9/2005 | |
| JP | 2006-312514 A | 11/2006 | |
| JP | 2007-317079 A | 12/2007 | |
| JP | 2007-326654 A | 12/2007 | |
| JP | 2009-115606 A | 5/2009 | |
| JP | 2012-211015 A | 11/2012 | |
| JP | 2013-199359 A | 10/2013 | |
| JP | 2013-230914 A | 11/2013 | |
| JP | 6142231 B2 | 6/2017 | |
| WO | 2013141066 A1 | 9/2013 | |
| WO | 2014050821 A1 | 4/2014 | |
| WO | 2014050822 A1 | 4/2014 | |

OTHER PUBLICATIONS

Applicant brings to the attention of the Examiner the existence of U.S. Appl. No. 09/050,785, filed Mar. 30, 1998 and issued as U.S. Pat. No. 6,021,888 A on Feb. 8, 2000, which has overlapping inventorship/ownership with the present case.

Applicant brings to the attention of the Examiner the existence of U.S. Appl. No. 10/312,186, filed Jun. 25, 2002, published as US 2004 0003982 A1 on Jan. 8, 2004, and issued as U.S. Pat. No. 6,843,362 B2 on Jan. 18, 2005, which was the national stage of PCT/JP2002/06372 filed on Jun. 25, 2002 and published as WO 2003 002436 A1 on Jan. 9, 2003, and which has overlapping inventorship/ownership with the present case.

Applicant brings to the attention of the Examiner the existence of U.S. Appl. No. 10/296,755, filed Jun. 14, 2002, published as US 2003 0135299 A1 on Jul. 17, 2003, and issued as U.S. Pat. No. 6,873,882 B2 on Mar. 29, 2005, which was the national stage of PCT/JP2002/05989 filed on Jun. 14, 2002 and published as WO 2003 000574 A1 on Jan. 3, 2003, and which has overlapping inventorship/ownership with the present case.

Applicant brings to the attention of the Examiner the existence of U.S. Appl. No. 10/425,521, filed Apr. 29, 2003, published as US 2003 0209410 A1 on Nov. 13, 2003, and issued as U.S. Pat. No. 6,820,736 B2 on Nov. 23, 2004, and which has overlapping inventorship/ownership with the present case.

Applicant brings to the attention of the Examiner the existence of U.S. Appl. No. 14/565,466, filed Dec. 10, 2014, published as US 2015 210484 A1 on Jul. 30, 2015, and issued as U.S. Pat. No. 9,617,083 B2 on Apr. 11, 2017, and which has overlapping inventorship/ownership with the present case.

Applicant brings to the attention of the Examiner the existence of U.S. Appl. No. 13/181,675, filed Jul. 13, 2011, published as US 2012 048682 A1 on Mar. 1, 2012, and issued as U.S. Pat. No. 8,887,897 B2 on Nov. 18, 2014, and which has overlapping inventorship/ownership with the present case.

EP Search Report of Dec. 9, 2015 in EP Pat App No 13764466.2 which is counterpart of US Pat App Pub Cite No. 1, US Pat Cite No. 1, and Frn Pat Doc Cite Nos. 1-3. Also see NPL Cite No. 1.

EP Search Report of Nov. 29, 2022 in EP Pat App No. 20782192.7 which is EP counterpart of the present application. Submitted additionally for Frn Pat Doc Cite No. 1.

Applicant brings to the attention of the Examiner the existence of U.S. Appl. No. 17/068,758, filed Oct. 12, 2020 and published as US 2021 0124324 A1 on Apr. 29, 2021, which has overlapping inventorship and/or ownership as in the present case.

Applicant brings to the attention of the Examiner the existence of U.S. Appl. No. 15/312,243, which is the national stage of International Application No. PCT/JP2015/082163 filed on Nov. 16, 2015 and published as WO 2016 080362 A1 on May 26, 2016 and as US 20170101273 A1 on Apr. 13, 2017, and which has overlapping

(56) References Cited

OTHER PUBLICATIONS inventorship and/or ownership as in the present case. Also see US Pat App Pub Cite No. 1.

\* cited by examiner

CONVEYOR SYSTEM, CAUSE INFORMATION REPORT DEVICE, AND COMPUTER-READABLE RECORDING MEDIUM RECORDING PROGRAM FOR CAUSE INFORMATION REPORT DEVICE

CROSS-REFERENCE TO RELATED APPLICATION, BENEFIT AND PRIORITY CLAIMS, AND INCORPORATION BY REFERENCE

This application is a continuation-in-part of and claims benefit under 35 USC 120 and 365(c) to copending International Application No PCT/JP2020/013075, filed 24 Mar. 2020; and further claims benefit of priority under 35 USC 119(a)-(d) to Japanese Patent Application No 2019-073018, filed 5 Apr. 2019, the contents of both of which applications are incorporated herein in their entireties by reference.

TECHNICAL FIELD

The present invention relates to a conveyor system including a conveyer device, a cause information report device to be used for the conveyer system, a program for the cause information report device, and a computer-readable recording medium recording the program for the cause information report device.

BACKGROUND ART

An abnormality detection device for detecting an abnormality that occurs in a conveyer device has been conventionally known (see Patent Literature 1, for example). Such an abnormality detection device can automatically detect the abnormality that occurs in a conveyer device, and inform a user of the occurrence of the abnormality.

However, the aforementioned abnormality detection device cannot detect all the abnormalities. This may cause the conveyer device to be stopped, though no abnormality is detected. To cope with such a case, a list of causes for dead conveyer devices, an investigation method of such causes, and an elimination method of the causes have been conventionally described, as so-called troubleshooting, in a manual, a help screen, and so on.

CITATION LIST

Patent Literature

Patent Literature 1: Japanese Unexamined Patent Application Publication No. Sho. 55-101505

SUMMARY OF INVENTION

According to the manual as mentioned above, if a conveyer device stops without detecting any abnormality, a user should refer to the manual or the like and investigate the cause for the stop of the conveyer device in accordance with troubleshooting described in a manual. Depending on the cause for the stop, it may be difficult to investigate the cause without specialized knowledge.

An object of the present invention is to provide a conveyor system, a cause information report device, a program for the cause information report device, and a computer-readable recording medium recording the program for the cause information report device, which can report a user, when the conveyer device stops, of information relating to a cause the stop.

A conveyer system according to the present invention includes: a conveyer device that includes a plurality of zones in a transport direction along which a conveyed object is transported, and a local controller provided in each of the zones for controlling a transport operation of the zone; and a cause information report device that reports information relating to a cause of non-transport in at least one of the plurality of zones. The cause information report device include: a selection instruction receiving unit that receives, from a user, a selection instruction for selecting one of the plurality of zones; and a report processor that obtains, from the local controller of a target zone that is a zone selected in accordance with the selection instruction, information relating to a phenomenon that is a possible cause included in the cause of the non-transport of the conveyed object in the target zone as clue information, and reports, when the clue information satisfies a determination condition previously set, cause information that is the information relating to the cause based on the clue information.

A cause information report device, according to the present invention, reports information relating to a cause of non-transport in at least one of a plurality of zones, the plurality of zones being included in a conveyer device in a transport direction along which a conveyed object is transported, the conveyer device further including a local controller provided in each of the zones for controlling the transport operation of the zone. The cause information report device includes: a selection instruction receiving unit that receives, from a user, a selection instruction for selecting one of the plurality of zones; and a report processor that obtains, from the local controller of a target zone that is a zone selected by the selection instruction, information relating to a phenomenon that is a possible cause included in the cause of the non-transport of the conveyed object in the target zone as clue information, and reports, when the clue information satisfies a determination condition previously set, cause information that is the information relating to the cause based on the clue information.

A program for a cause information report device, according to the present invention, reports information relating to a cause of non-transport in at least one of a plurality of zones, the plurality of zones being included in a conveyer device in a transport direction along which a conveyed object is transported, the conveyer device further including a local controller provided in each of the zones for controlling the transport operation of the zone. The program causes a computer to function as: a selection instruction receiving unit that receives, from a user, a selection instruction for selecting one of the plurality of zones; and a report processor that obtains, from the local controller of a target zone that is a zone selected by the selection instruction, information relating to a phenomenon that is a possible cause included in the cause of the non-transport of the conveyed object in the target zone as clue information, and reports, when the clue information satisfies a determination condition previously set, cause information that is the information relating to the cause based on the clue information.

A computer readable recording medium that records a program for a cause information report device, according to the present invention reports information relating to a cause of non-transport in at least one of a plurality of zones, the plurality of zones being included in a conveyer device in a transport direction along which a conveyed object is transported, the conveyer device further including a local controller provided in each of the zones for controlling the transport operation of the zone. The program causes a computer to function as: a selection instruction receiving unit that receives, from a user, a selection instruction for selecting one of the plurality of zones; and a report processor that obtains, from the local controller of a target zone that is a zone selected by the selection instruction, information relating to a phenomenon that is a possible cause included in the cause of the non-transport of the conveyed object in the target zone as clue information, and reports, when the clue information satisfies a determination condition previously set, cause information that is the information relating to the cause based on the clue information.

DESCRIPTION OF EMBODIMENT(S)

Figure 1:
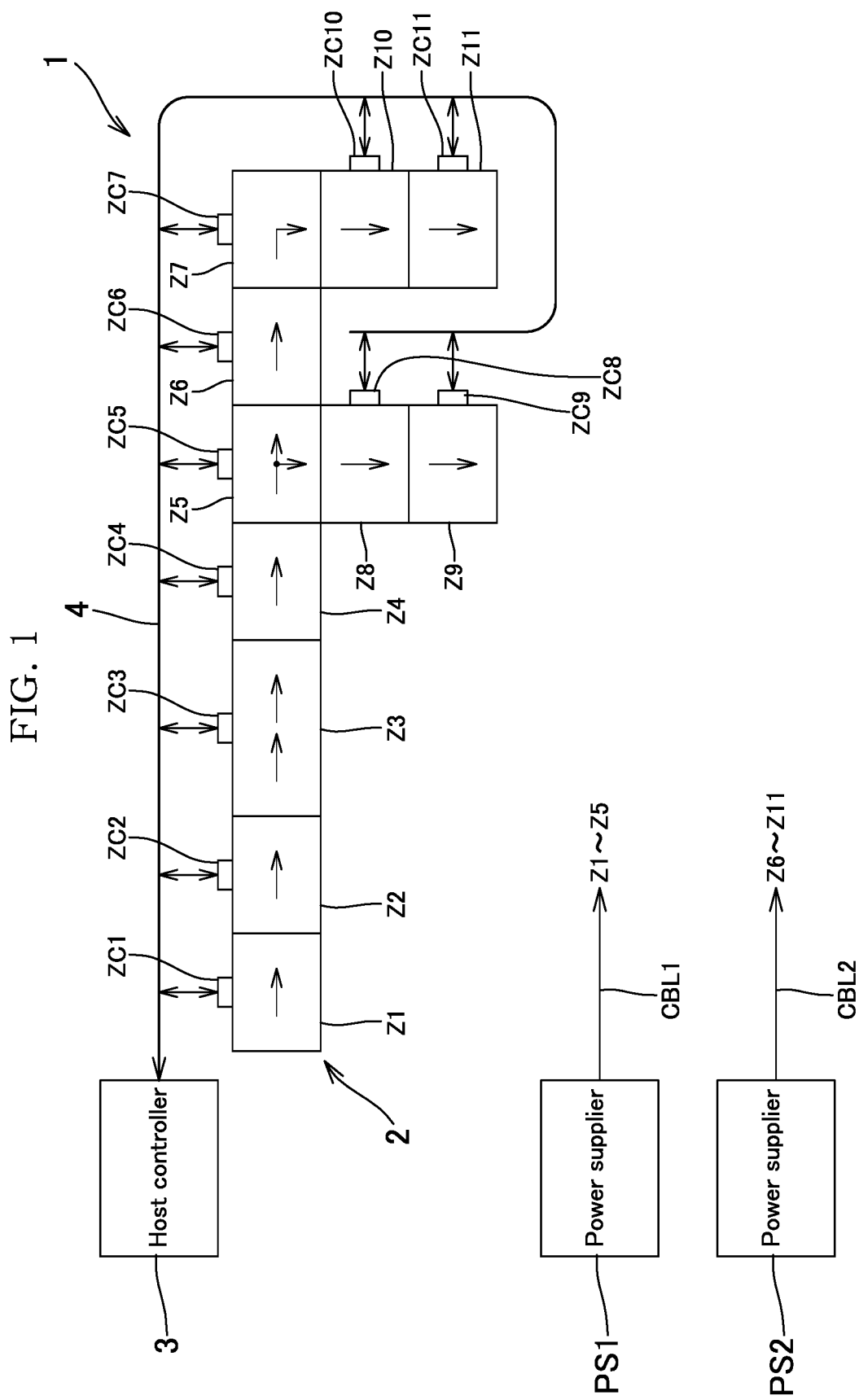
FIG. 1 is a block diagram showing an example of a conveyer system according to an embodiment of the present invention.

Hereinafter, embodiments of the present invention are described with reference to the drawings. Same constitutions are assigned the same reference signs throughout the drawings, and the respective description of such constitution is omitted. FIG. 1 is a block diagram showing an exemplary constitution of the conveyer system according to an embodiment of the present invention. Conveyer system 1 shown in FIG. 1 includes conveyer device 2, host controller 3 (a cause information report device), and power suppliers PS1 and PS2. Host controller 3 corresponds to an example of the cause information report device.

Conveyer device 2 has a transport path that is divided in a plurality of zones Z1 to Z11. Hereinafter, zones Z1 to Z11 are collectively referred to as zone Z. It is an object of conveyer device 2 to transport conveyed objects that are of roughly uniform size, such as pallets, containers, and trays. Each zone Z has a length sufficient to allow placement therewithin of at least one conveyed object, in most cases.

Zone Z includes forward zone(s) in which a conveyed object is made to move forward, and direction changing zone(s) in which a conveyed object can be conveyed in a direction that intersects the forward direction. The forward zones include a first forward zone provided with one drive roller 5a described later, and a second forward zone provided with two drive rollers 5a. The direction changing zones include a branched zone capable of causing the transport direction of the conveyed object to be branched so that selection is possible between forward and direction change.

In FIG. 1, types of the respective zones are indicated by arrows. Forward arrows indicate forward zones. Zones with one forward arrow are a first forward zone, and zones with two forward arrows are a second forward zone. Arrows that change direction indicate direction changing zones, and arrows that are branched indicate branched zones among the direction changing zones. These are merely examples of types of zones Z, and the present invention of course includes other types of zones.

The layout of the respective types of zones Z shown in FIG. 1 is employed for convenience of description, and does not necessarily indicate a layout of zones Z, which is suitable for practical use.

Each of zones Z1 to Z11 is constituted from one of conveyer modules M1 to M11. Hereinafter, conveyer modules M1 to M11 are collectively referred to as conveyer module M. The types of conveyer modules M include forward conveying module(s) Ms constituting the forward zones, and direction changing module(s) Mt constituting the direction changing zones.

Conveyer modules M1 to M11 include conveyer mechanisms and local controllers ZC1 to ZC11 that control operation of conveyer mechanisms, respectively. In other words, each of zones Z1 to Z11 includes a corresponding one of local controllers ZC1 to ZC11.

Local controllers ZC1 to ZC11 are collectively referred to as local controller ZC. Furthermore, notwithstanding that reference may be made simply to zones Z, zones Z should be understood to include by extension conveyer modules M that constitute the respective zones Z.

Transmission and reception of data is made possible between local controllers ZC1 to ZC11 and host controller 3 by way of communication cable 4 through which ZC1 to ZC11 and host controller 3 are interconnected. Communication between respective local controllers ZC and host controller 3 may be made possible, for example, via Ethernet (registered trademark) or other such communication protocol, and/or communication therebetween may be made possible in wireless fashion rather than by way of communication cable 4. There is no limitation with respect to such communication protocol.

Power sources PS1 and PS2 serve as a power source device that outputs source voltage Vd for driving a motor in each zone Z. Power source PS1 supplies driving source voltage Vd to zones Z1 to Z5 through power source cable CBL1, and power source PS2 supplies the driving source voltage Vd to zones Z6 to Z11 through power source cable CBL2, for example. The driving source voltage Vd is 24V, for example.

The driving source voltage for actuating each local controller ZC is supplied from another power source system (not shown) different from power sources PS1 and PS2.

Figure 2:
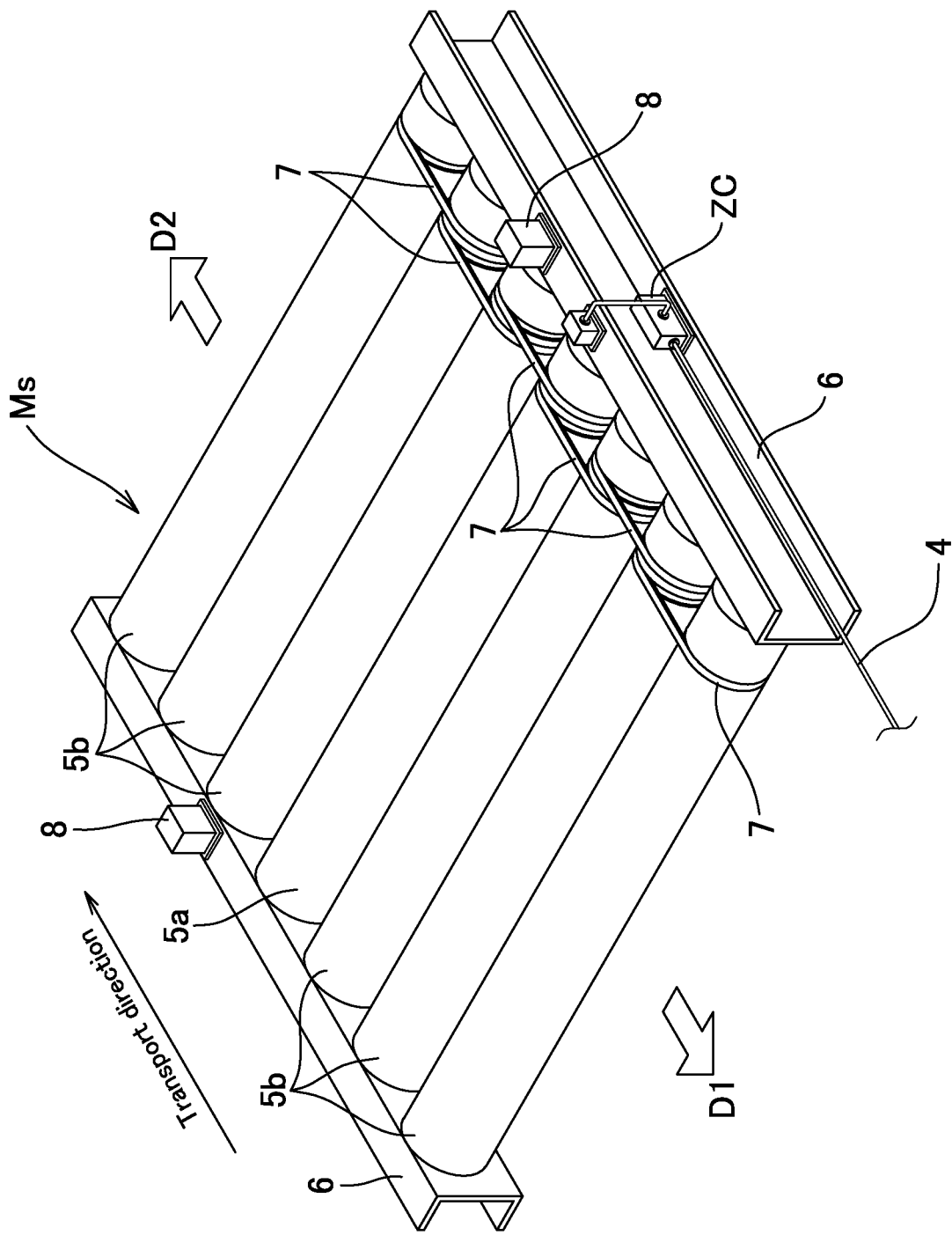
FIG. 2 is a perspective view showing an exemplary constitution of a forward conveying module that constitutes a forward zone.

FIG. 2 is a perspective view showing the exemplary constitution of forward conveying module Ms constituting a forward zone. Forward conveying module Ms shown in FIG. 2 is a so-called roller conveyer. Forward conveying module Ms is provided with the conveyer mechanism, local controller ZC, and inventory sensor 8. The conveyer mechanism is provided with drive roller 5a having an internal motor, a plurality of driven rollers 5b rotating following drive roller 5a, a pair of side frames 6, 6 supporting drive roller 5a and driven rollers 5b at their shafts at predetermined intervals, and transmission belt 7. Hereinafter, drive roller 5a and driven rollers 5b are collectively referred to as transport rollers 5.

Transport rollers 5 adjacent to each other in forward conveying module Ms are wrapped about by transmission belt 7. With this constitution, rotary drive force of drive roller 5a is transmitted through the transmission belt 7 to other rollers i.e., driven rollers 5b, and thus each of driven rollers 5b is made to rotate following drive roller 5a. The transport path for the conveyed object is formed by the top face of transport rollers 5.

Drive roller 5a performs rotary driving in accordance with a control signal from local controller ZC. Accordingly, local controller ZC can control the transport of the conveyed object at forward conveying module Ms, i.e., at zone Z.

Forward conveying module Ms shown in FIG. 2 is used for a first forward zone provided with one drive roller 5a. Forward conveying module Ms for a second forward zone is provided with two drive rollers 5a. Hereinafter, forward conveying module Ms for the first forward zone is referred to as forward conveying module Ms1 and forward conveying module Ms for the second forward zone is referred to as forward conveying module Ms2.

Forward conveying module Ms shown in FIG. 2 is merely described as an example, so that the number of transport roller(s) 5 at each of zones Z can be increased or decreased as desired. Although zones Z serve as a roller conveyer in an example, zones Z may be constituted from a conveyer mechanism, such as a belt conveyer, other than the roller conveyer.

Inventory sensor 8 is installed at locations near the downstream end of the side frames 6 and 6, for example. Inventory sensor 8 is a transmission-type photoelectronic sensor, for example, and has a light-emission component in one of the side frames 6 and 6 and a light-receiving component in the other. A pair of the light-emission component and the light-receiving component functions as a single sensor. Inventory sensor 8 detects presence/absence of the conveyed object on the transport path of forward conveying module Ms, and causes a signal obtained as a result of the detection to be outputted to local controller ZC.

In the description which follows, inventory sensor 8 and boundary sensor 9 described later are turned ON when a conveyed object is detected, and turned OFF when a conveyed object is not detected. The logic relating to the turning ON and OFF may be reversed.

Figure 3:
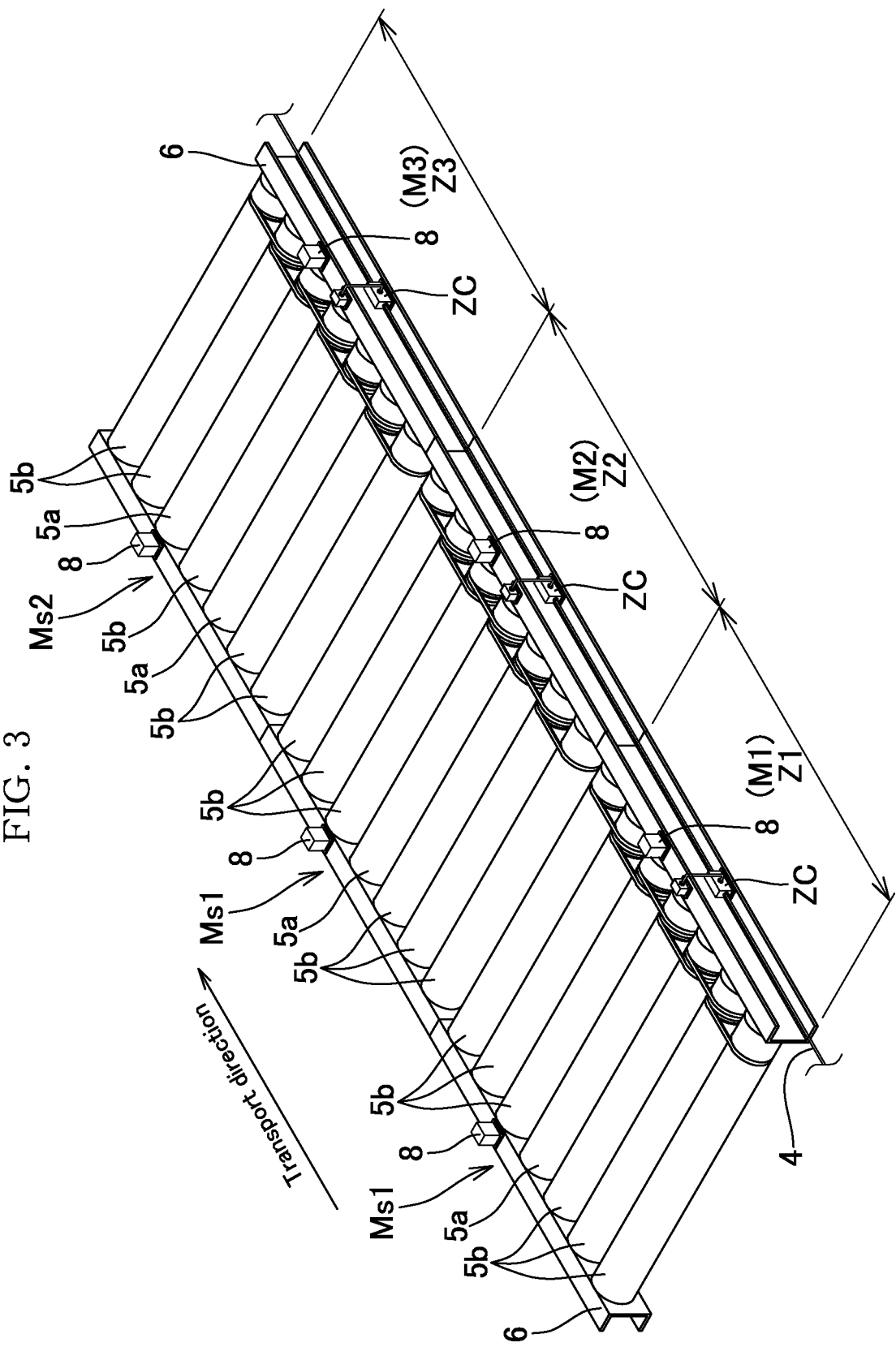
FIG. 3 is a perspective view showing an exemplary constitution of zones Z1 to Z3 shown in FIG. 1.

FIG. 3 is a perspective view showing the exemplary constitution of zones Z1 to Z3 shown in FIG. 1. As indicated with the arrows in FIG. 1, zones Z1 and Z2 are the first forward zone, and zone Z3 is the second forward zone. Accordingly, zones Z1 and Z2 are each composed of forward conveying module Ms1 provided with one drive roller 5a, and the zone Z3 is composed of forward conveying module Ms2 provided with two drive rollers 5a. Forward conveying modules Ms1, Ms1, and Ms2 are connected to form zones Z1 to Z3.

Figure 4:
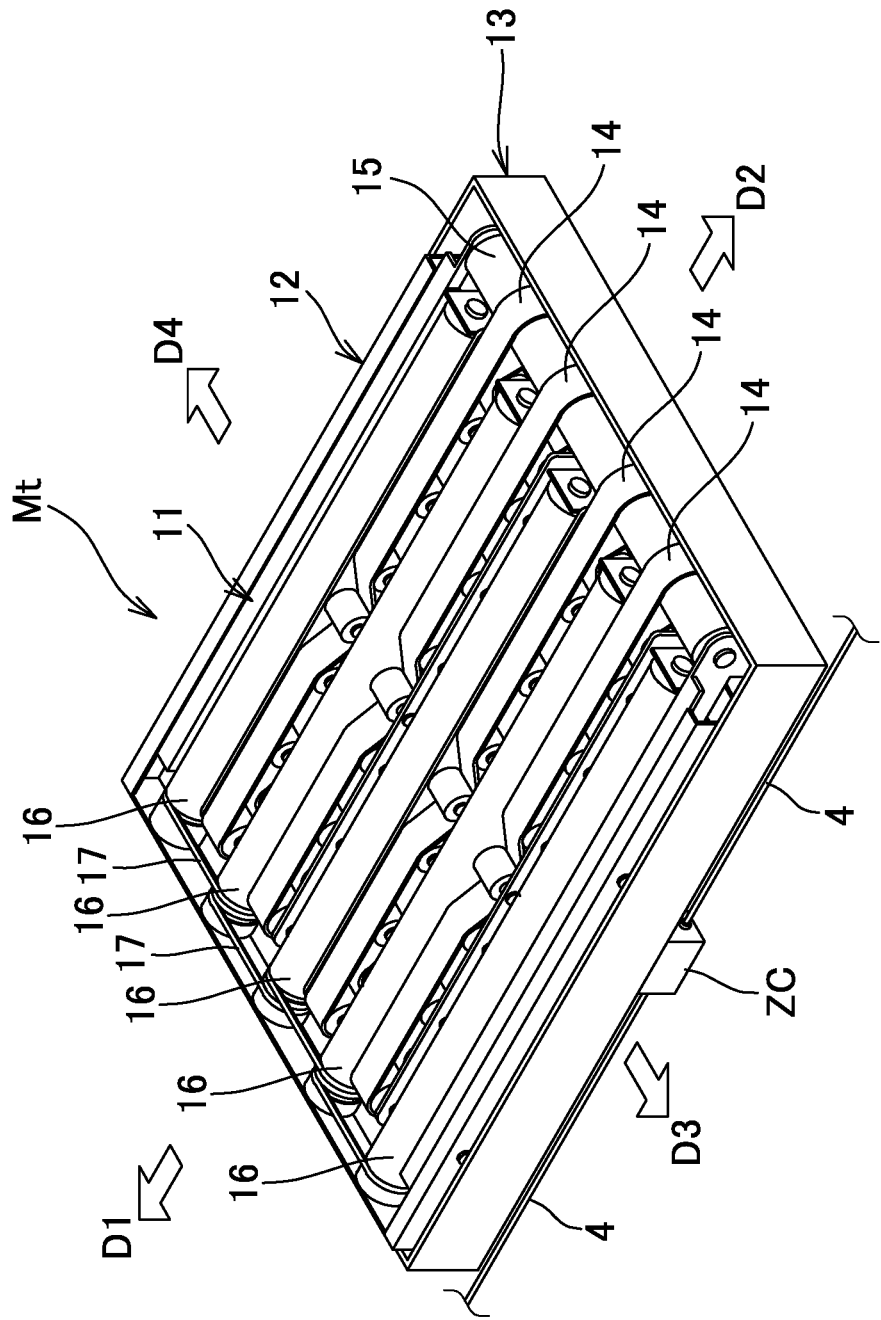
FIG. 4 is a perspective view showing an exemplary constitution of a direction changing module that constitutes a direction changing zone including a branched zone.
Figure 5:
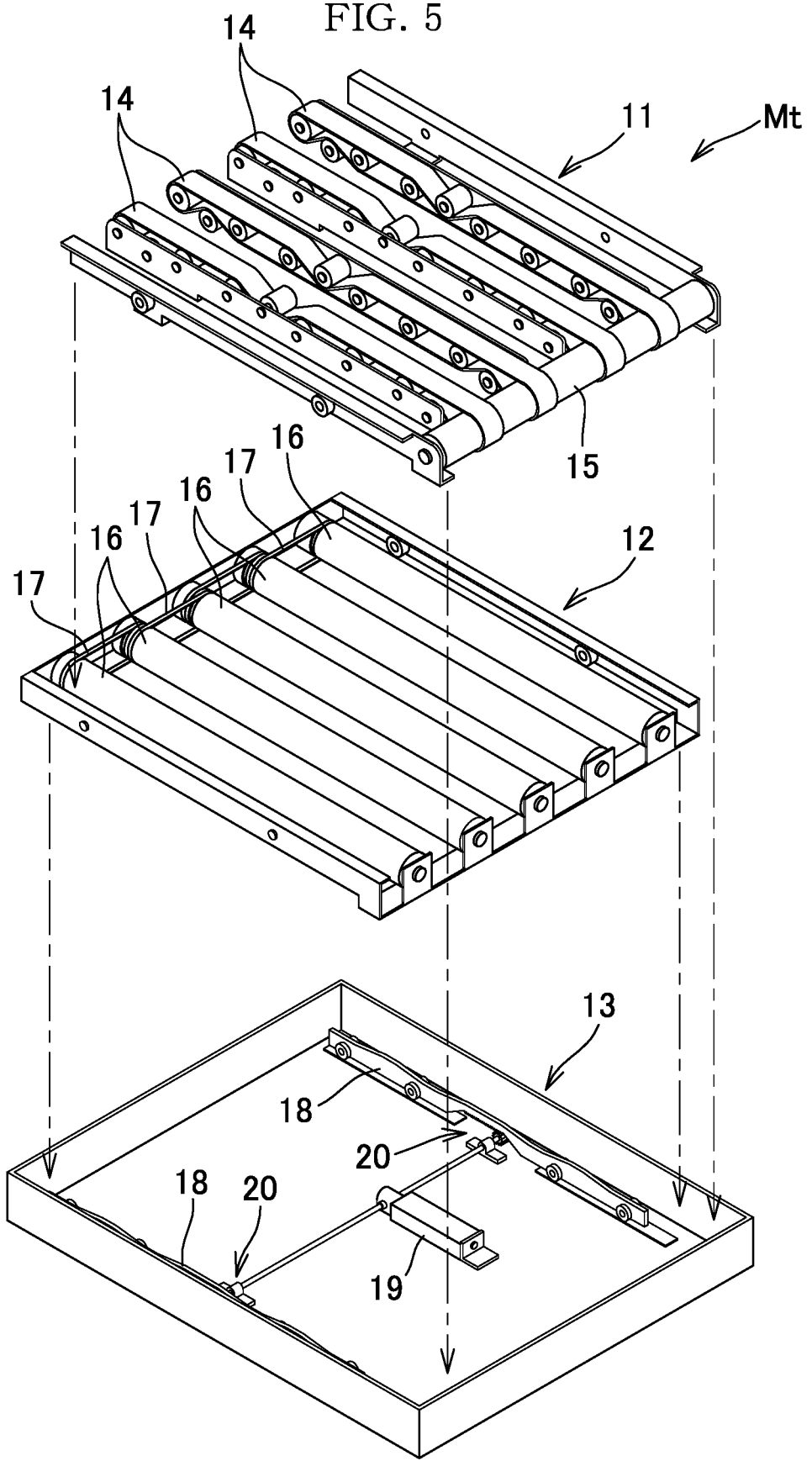
FIG. 5 is an exploded perspective view showing the direction changing module shown in FIG. 4.
Figure 6:
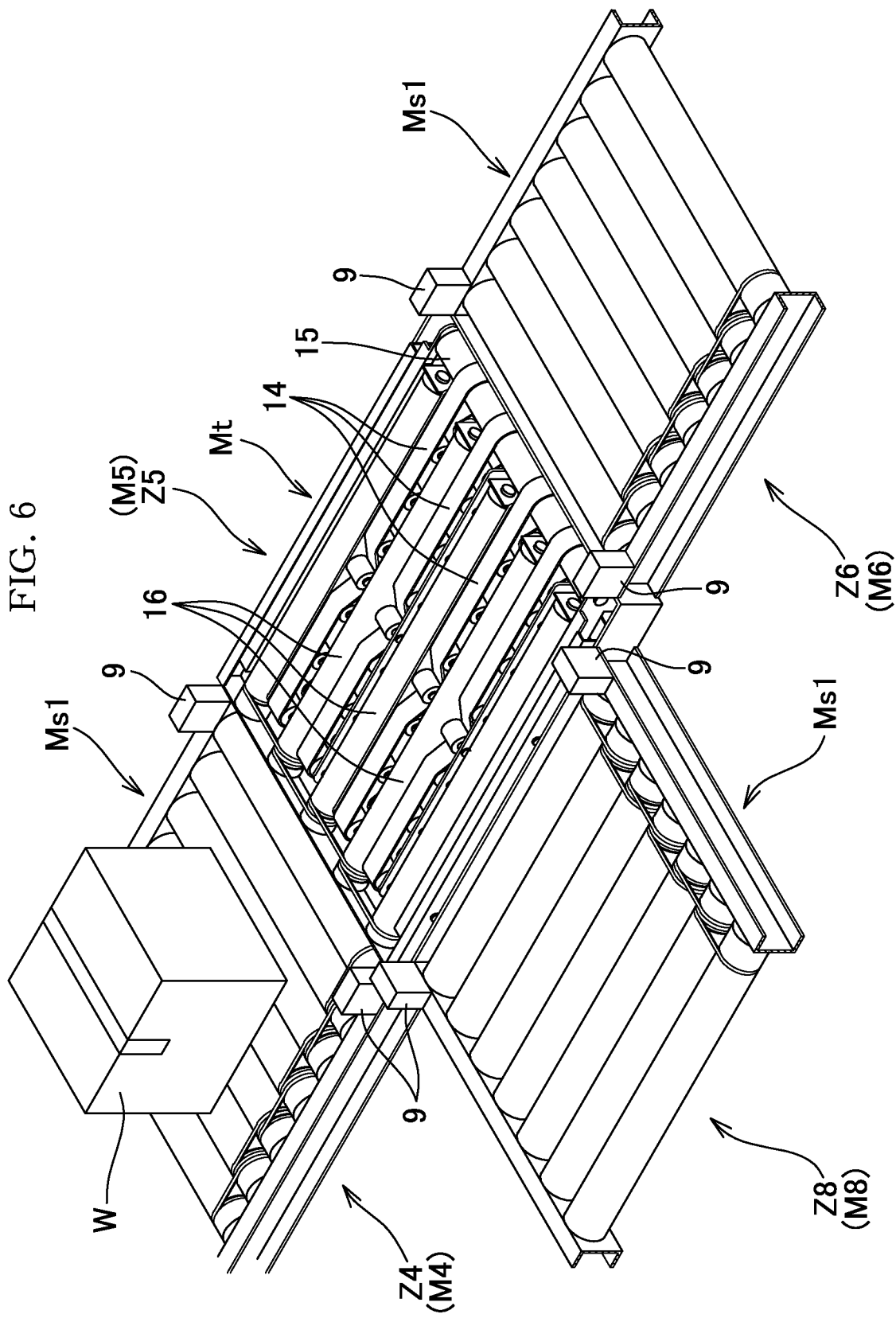
FIG. 6 is a perspective view showing a state in which zones Z4, Z5, Z6, and Z8 shown in FIG. 1 are connected.

FIG. 4 is a perspective view showing the exemplary constitution of direction changing module Mt constituting direction changing zone(s) including a branched zone. FIG. 5 is an exploded perspective view of direction changing module Mt shown in FIG. 4. FIG. 6 is a perspective view showing a state where zones Z4, Z5, Z6, and Z8 shown in FIG. 1 are connected. Direction changing module Mt shown in FIG. 4 can cause the transport direction of a conveyed object to be changed in a plurality of directions by switching carry-in and carry-out directions.

Direction changing module Mt includes a direction change mechanism, local controller ZC, elevator controller 21 (described later), inventory sensor 8 (not shown), and a plurality of boundary sensors 9. The direction change mechanism includes main transport conveyer 11, subordinate transport conveyer 12, and elevator device 13, as shown in FIG. 5. Main transport conveyer 11 includes a plurality of belts 14, and drive roller 15 from which the plurality of belts 14 are suspended as a result of being wrapped thereabout. Drive roller 15 has an internal motor and performs rotary driving in accordance with a control signal from local controller ZC. The top faces of the plurality of belts 14 serve as the transport path of main transport conveyer 11. The transport direction of main transport conveyer 11 is the same as the transport direction of conveyer device 2.

Subordinate transport conveyer 12 is a so-called roller conveyer. Subordinate transport conveyer 12 includes a plurality of rollers 16 and belt 17 for causing the rollers 16 to rotate in a linked fashion. One of the plurality of rollers 16 may, for example, be a drive roller having an internal motor. The drive roller performs rotary driving in accordance with a control signal from local controller ZC.

Respective rollers 16 are arranged such that each is located between a pair of belts 14 of main transport conveyor 11. The top faces of rollers 16 serve as the transport path of subordinate transport conveyer 12. The transport direction of subordinate transport conveyer 12 is perpendicular to the transport direction of main transport conveyer 11, i.e., orthogonal direction of the transport direction of conveyer device 2.

Elevator device 13 includes a pair of direct-acting cams 18, elevator motor 19 that performs rotary driving in accordance with a control signal from elevator controller 21, and rack and pinion mechanism 20 that causes the pair the direct-acting cams 18 to move in a sliding fashion by the driving force of elevator motor 19. Main transport conveyer 11 and the subordinate transport conveyer 12 move up and down in accordance with slide positions of direct-acting cam 18.

Elevator motor 19 drives rack and pinion mechanism 20 via a gear (not shown) to cause the position of direct-acting cam 18 to be moved, so as to be capable of switching a forward position in which main transport conveyor 11 protrudes above subordinate transport conveyer 12 and direction change position in which subordinate transport conveyor 12 protrudes above main transport conveyor 11.

Drive controller 51*b* (described later) of local controller ZC outputs, to elevator controller 21, a direction indication signal indicating a transport direction including the forward direction and the cross direction, so as to provide elevator controller 21 with a command of changing its position.

Local controller ZC (drive controller 51*b*) causes main transport conveyor 11 to drive, while direction changing module Mt is in its forward position as a result of its orientation having been changed by elevator controller 21, to thereby cause a conveyed object to move forward. Local controller ZC (drive controller 51*b*) causes subordinate transport conveyor 12 to drive, while direction changing module Mt is in its direction change position as a result of its orientation having been changed by elevator controller 21, to thereby cause a conveyed object to be conveyed in a direction that intersects the forward direction. Accordingly, direction changing module Mt can change the transport direction of the conveyed object.

It is merely required for direction changing module Mt to change the transport direction of the conveyed object, so that operation of direction changing module Mt is not necessarily limited in the example in which the transport direction of the conveyed object is changed by controlling the moving up and down of main transport conveyor 11 and subordinate transport conveyer 12.

As shown in FIGS. 2 and 4, at the respective conveyor modules M, the direction that is upstream in the transport direction is indicated by reference numeral D1, the direction that is downstream in the transport direction is indicated by reference numeral D2, the direction that is toward the right of the transport direction is indicated by reference numeral D3, and the direction that is toward the left of the transport direction is indicated by reference numeral D4.

Zone Z5 shown in FIG. 6 is connected to zone Z4 in the upstream side in the transport direction (direction D1), to zone Z6 in the downstream side in the transport direction (direction D2), and to zone Z8 in the right side in the transport direction (direction D3). Zone Z5 serves as direction changing module MT, and zones Z4, Z6, and Z8 serve as forward conveying module Ms1.

Boundary sensor 9 is, for example, a photoelectronic sensor, like inventory sensor 8, and has a pair of a light-emission component and a light-receiving component, which works as a single sensor. Inventory sensor 8 and boundary sensor 9 are not limited to the transmission photoelectronic sensor, but may be a reflection photoelectronic sensor, or the like.

Boundary sensor 9 detects conveyed object W at the boundary with another zone Z that is adjacent to zone Z5, and outputs a signal obtained as a result of the detection of conveyed object W to local controller ZC of zone Z5 (direction changing module Mt). Boundary sensor 9 is a part of direction changing module Mt of zone Z5, and is merely required to detect conveyed object W at the boundary with another zone Z. Accordingly, as shown in FIG. 6, boundary sensor 9 may be, for example, provided in another zone Z adjacent to zone Z5.

Although FIG. 6 shows an example in which zone Z5 is not connected to another zone Z at its left side in the transport direction (direction D4), another zone Z can also be connected to the direction D4. Direction changing module Mt for the zone Z5 can also be used as conveyer module M7 of zone Z7.

Figure 7:
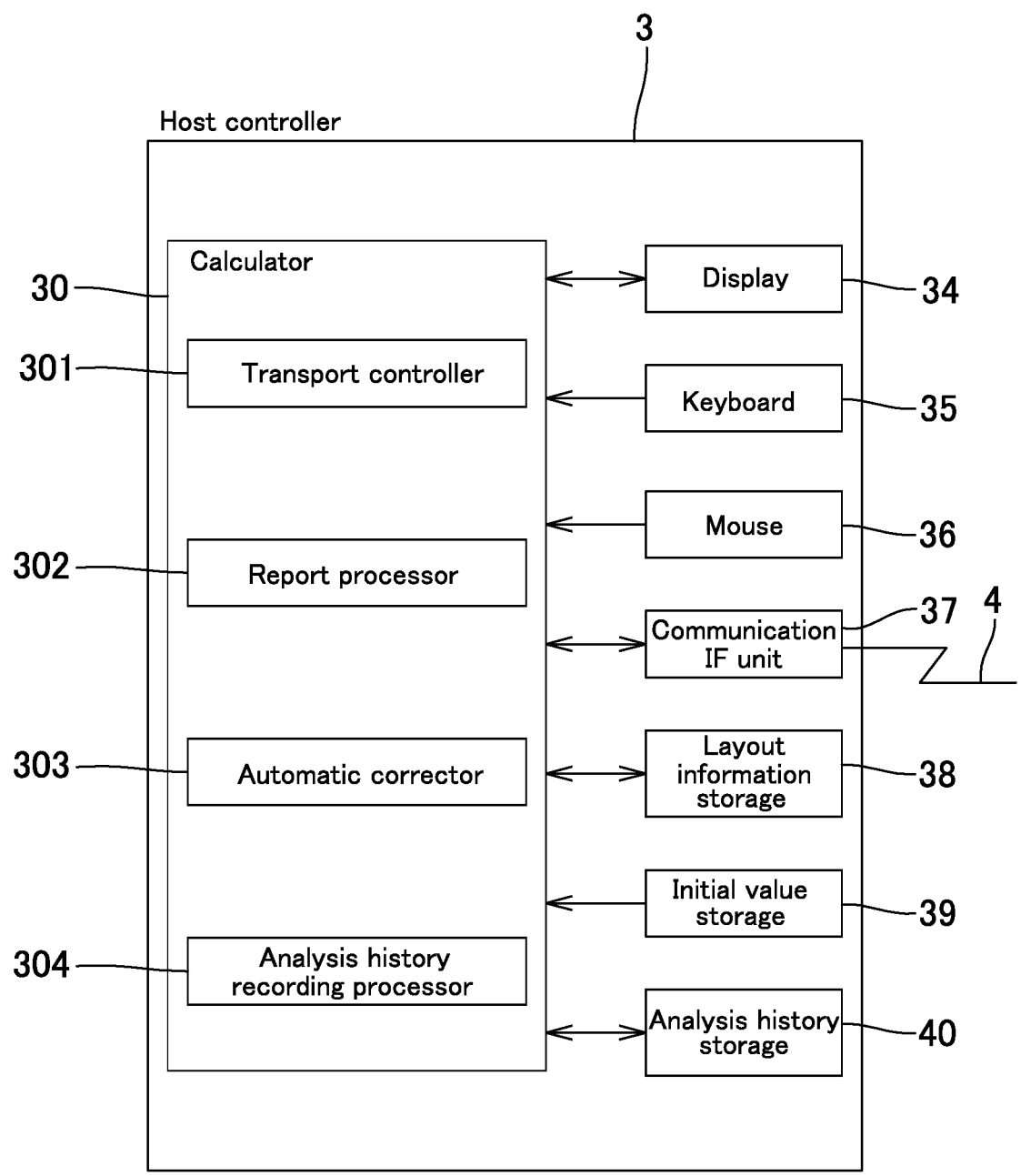
FIG. 7 is a block diagram showing an exemplary constitution of a host controller shown in FIG. 1.

FIG. 7 is a block diagram showing an exemplary constitution of host controller 3 shown in FIG. 1. Host controller 3 shown in FIG. 7 includes calculator 30, display 34, keyboard 35 (selection instruction receiving unit), mouse 36 (selection instruction receiving unit), communication interface (IF) unit 37, layout information storage 38 (constitution information storage, layout information storage), initial-value storage 39, and analysis history storage 40.

Host controller 3 is, for example, constituted by employing an information processing device including a personal computer. Display 34 is, for example, a display device employing a liquid crystal display device, an organic electroluminescence (EL) panel, or the like.

Communication IF unit 37 is, for example, a communication interface circuit including an Ethernet (registered trademark). Communication IF unit 37 is constituted so as to permit transmission and reception of data with the respective local controllers ZC through communication cable 4.

Layout information indicating the layout of respective zones Z is previously stored in layout information storage 38. Furthermore, stored in advance at layout information storage unit 38 in association with respective zones Z are addresses (communication addresses) assigned to respective zones Z, zone type information for respective zones Z, and motor information. In addition, power source system information indicating which zone is supplied with drive source voltage Vd from each of the power sources PS1 and PS2 is previously stored in layout information storage 38.

For example, in the case of conveyor device 2 shown in FIG. 1, layout information would indicate that zones Z1 to Z7 are connected in series, zone 5 is connected to zone 8 in direction D3 (toward the right of the transport direction), zone 8 is connected to zone Z9 in direction D2 (downstream in the transport direction), zone Z7 is connected to zone Z10 in direction D3, and zone Z10 is connected to zone Z11 in direction D2.

Assigned to local communication unit 57 (described later) of each local controller ZC is an address for identifying itself. The address assigned to each of local communication unit 57 is also the address of zone Z and local controller ZC that is provided with concerned local communication unit 57. Addresses of respective zones Z are stored in advance in layout information storage unit 38.

In the example shown in FIG. 1, numerals next to the reference signs of zones Z indicate the addresses. For example, the address of zone Z1 is 1, and the address of zone Z9 is 9.

Layout information storage 38 in which the layout information and the address of each of the zones Z are stored corresponds to an example of the constitution information storage and the layout information storage.

Zone type information indicates types of respective zones Z. The types of respective zones include the forward zone (the first forward zone and the second forward zone), the direction changing zone, and so on. In the example shown in FIG. 1, zones Z1, Z2, Z4, Z6, Z8 to Z11 are the first forward zone, zone Z3 is the second forward zone, and zones Z5 and Z7 are the direction changing zone.

The motor information indicates a connection form of motor 61 in each zone Z. Specifically, each zone Z is provided with a plurality of connectors CN1 for connection of motor 61, and the motor information indicates whether motor 61 is connected to respective connectors CN1.

Stored in advance in initial value storage 39 is an initial timer value that is an initial value of a timer value to be stored in setting value storage 58 (timer value storage) of each local controller ZC, which is described later.

Cumulatively stored in analysis history storage 40, as an analysis history, is information in which clue information obtained by report processor 302 (described later) is associated with a determination result of a determination condition based on the clue information.

Calculator 30 includes for example: a central processing unit (CPU) that executes a predetermined arithmetic operation; a non-volatile storage section, such as a random-access memory (RAM) that stores data temporarily, a hard disk drive (HDD) and a solid state drive (SSD); a timer circuit; and circuits peripheral to these units.

The aforementioned storage device stores a program for a cause information report device according to an embodiment of the present invention, for example. The storage device may also be used as layout information storage 38, initial value storage 39, and analysis history storage 40. Calculator 30 executes a program stored in the storage device so as to function as transport controller 301, report processor 302, automatic corrector 303, and analysis history recording processor 304.

Transport controller 301 sends an instruction, data, and the like to each local controller ZC through communication IF unit 37, and receives data and the like from each local controller ZC through communication unit IF unit 37, so as to control the operation of conveyer device 2. Hereinafter, the communication by calculator 30 (transport controller 301, report processor 302, automatic corrector 303, analysis history recording processor 304) with zones Z through communication IF unit 37 is referred to simply as communication, acquisition, access, and so forth by calculator 30 (report processor 302, etc.).

In addition, calculator 30 (report processor 302, etc.) requires local controllers ZC in respective zones Z to send, to calculator 30, information relating to, in each zone Z, state storage 54, direction setting information storage 55, setting value storage 58, and program storage 59, detection values from Hall effect elements H1 to H3, inventory sensor 8, boundary sensor 9 and the like, so as to acquire the information. Such operation is referred to simply as access to and acquisition from, by calculator 30 (report processor 302 etc.), structural components, such as state storage 54 in each zone Z.

Report processor 302 obtains, as the clue information, information relating to a phenomenon that can be a cause of non-transport of a conveyed object by a target zone, from local controller ZC of the target zone that is zone Z selected by a user. When the obtained clue information satisfies the determination condition previously set, report processor 302 reports cause information that is information relating to the cause that the conveyed object is not conveyed.

Automatic corrector 303 corrects information stored in setting value storage 58 and so on, in order to resolve the cause of the non-transport, based on an analysis result obtained by report processor 302.

Analysis history recording processor 304 associates the clue information obtained by report processor 302 with the determination result of the determination condition based on the clue information, and causes the resultant information to be cumulatively stored in analysis history storage 40 as the analysis history.

Figure 8:
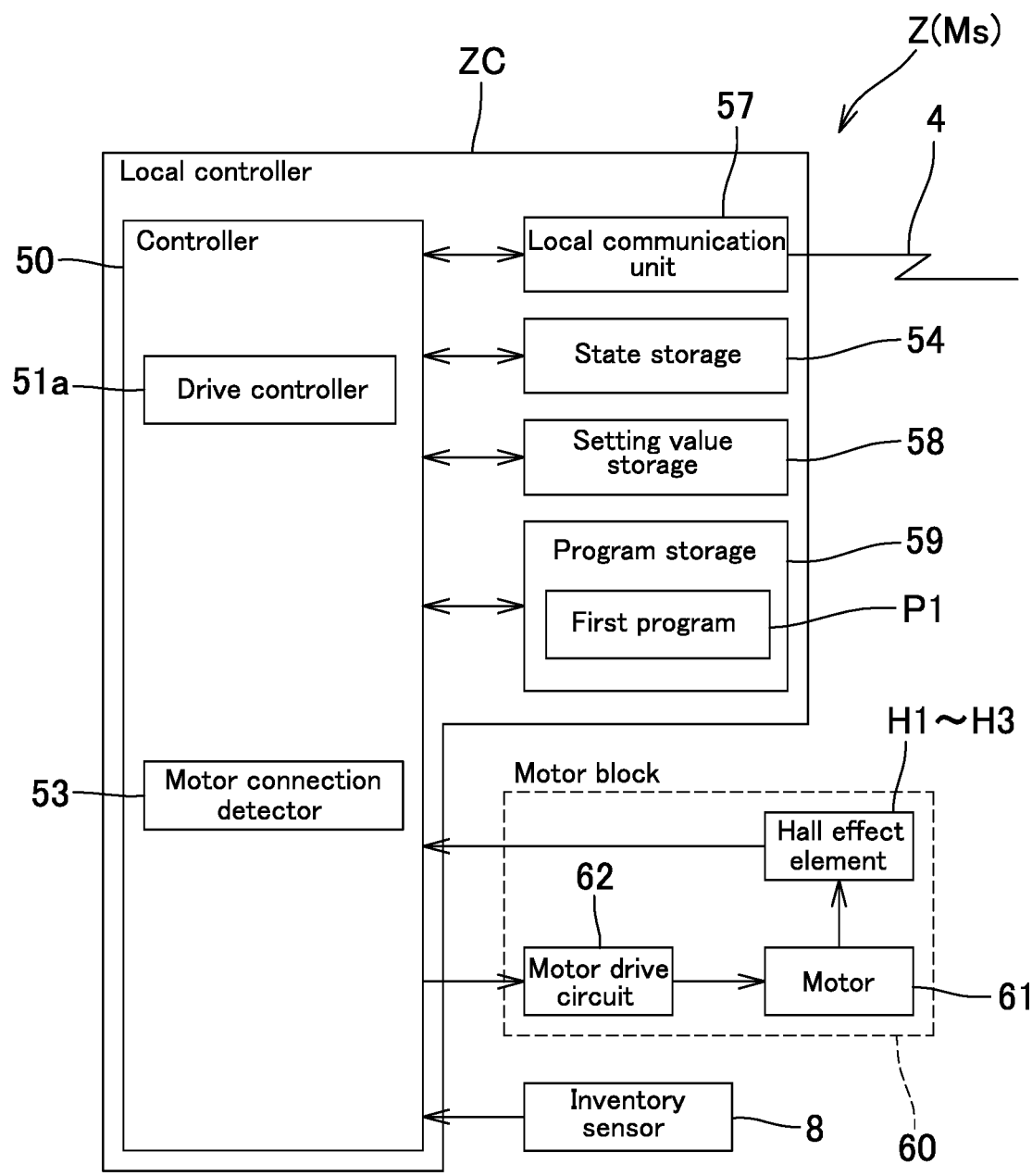
FIG. 8 is a block diagram showing an exemplary electrical constitution of each of the zones shown in FIG. 1.
Figure 9:
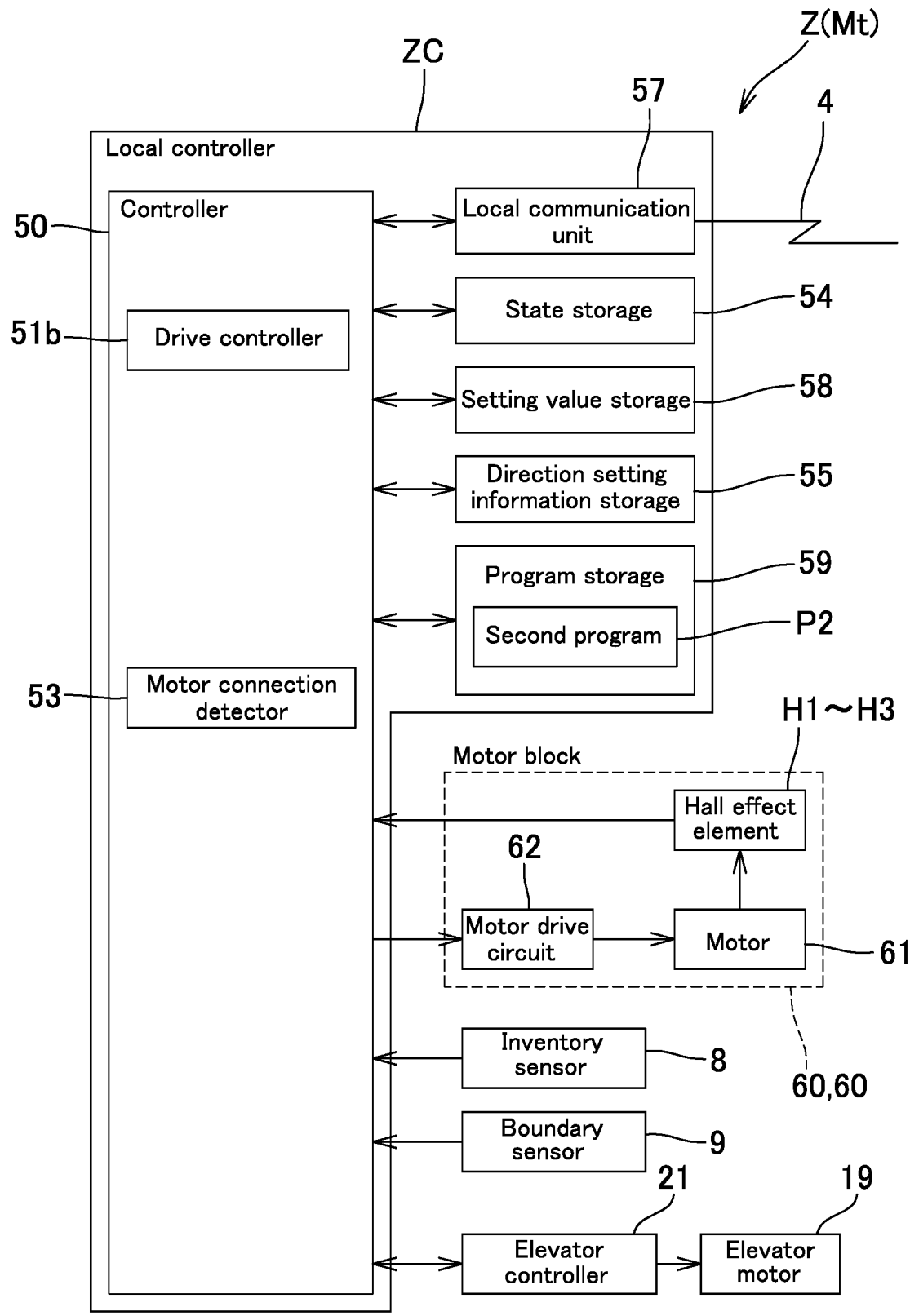
FIG. 9 is a block diagram showing an exemplary electrical constitution of each of the zones shown in FIG. 1.

FIGS. 8 and 9 are block diagrams showing an exemplary electrical constitution of each of the zones shown in FIG. 1. FIG. 8 shows the constitution of forward conveying module Ms used for the forward zone, and FIG. 9 shows the constitution of direction changing module Mt used for the direction changing zone.

Conveyer module M (forward conveying module Ms and direction changing module Mt) includes local controller ZC, motor block 60, and inventory sensor 8. Local controller ZC includes controller 50, local communication unit 57, state storage 54, setting value storage 58 (a local communication setting storage, a motor connection information storage, a timer value storage), and program storage 59. Motor block 60 includes motor 61, motor drive circuit 62, and Hall effect elements H1, H2, and H3.

With reference to FIG. 9, direction changing module Mt further includes boundary sensor 9, elevator motor 19, and elevator controller 21 (switch response signal outputter). Local controller ZC of direction changing module Mt further includes direction setting information storage 55.

Local communication unit 57 is a communication interface circuit employing the same communication protocol as communication IF unit 37 of host controller 3. Local communication unit 57 can send and receive data with other local controllers ZC and host controller 3 through communication cable 4. Each of the local communication units 57 is provided with an address for identifying itself.

Hereinafter, communication by controller 50 (drive controllers 51a and 51b, and motor connection detector 53) with other zones Z and host controller 3 through local communication unit 57 is referred to simply as communication, acquisition, access, and so on by controller 50 (drive controllers 51a and 51b, and so on).

State storage 54 is a storage region to be used as an operation region in which data is temporarily stored. State storage 54 stores permission information indicating presence/absence of a permission for carry-in of a conveyed object into another zone Z adjacent to own zone, to which state storage 54 belongs, in the downstream side of the own zone, and a request information indicating presence/absence of carry-out request of a conveyed object from still another zone adjacent to the own zone in the upstream side thereof, for example.

Setting value storage 58 stores carry-in timer value "tin", carry-out timer value "tout", jam determination time "tj", switch monitoring time "tlm", motor connection information, and local address information. Setting value storage 58 corresponds to an example of the timer value storage, the motor connection information storage, and the local communication setting storage. Carry-in timer value tin, carry-out timer value tout, jam determination time tj, and switch monitoring time tlm correspond to an example of the timer value.

Information stored in setting value storage 58 can be sent to host controller 3 in accordance with an instruction from host controller 3, and can be changed in accordance with an instruction from host controller 3.

Carry-in timer value tin is a timer value of a timer that counts duration time of motor 61 for making motor 61 to continue driving until a conveyed object carried out from upstream zone Z is conveyed to a predetermined position of own zone Z in which carry-in timer value tin is stored.

Carry-out timer value tout is a timer value of a timer that counts duration time of motor 61 for making motor 61 to continue driving until a conveyed object in the own zone Z is completely carried out to downstream zone Z, when the conveyed object in the own zone Z is carried out to downstream zone Z.

Jam determination time tj is determination time for determining a jam error (clogging of a conveyed object) based on time during which inventory sensor 8 detects the conveyed object. Switch monitoring time tlm is determination time for determining an abnormality in direction switching at direction changing module Mt.

The motor connection information indicates whether motor 61 should be connected to each connector CN1 in one or a plurality of motor blocks 60 provided in own zone Z in which the motor connection information is stored. The motor connection information indicates whether motor 61 should be connected to each connector CN1, in such a manner that: when each connector CN1 is provided with, for convenience, port numbers 1, 2, and so on, motor 61 should be connected to port number 1, motor 61 should not be connected to port number 2, and so on.

The local address information indicates an address provided for another zone Z adjacent to own zone in which the local address information is stored.

Direction setting information storage 55 previously stores direction setting information for setting whether transport is performed for each inlet/outlet direction of own zone to which the direction setting information storage 55 belongs. Specifically, direction changing module Mt can constitutionally switch a transport direction to each inlet/outlet at four directions D1, D2, D3, and D4.

For example, for zone Z5 shown in FIG. 1, if a conveyed object is not transported backward, direction D1 is set so that no transport is performed through direction D1. Directions D2 and D3 to which zones Z6 and Z8 are respectively connected are set so that transport is performed through directions D2 and D3. Direction D4 to which no other zone Z is connected is set so that no transport is not performed through direction D4.

Similarly, for zone Z7 shown in FIG. 1, if a conveyed object is not transported backward, direction D1 is set so that no transport is performed through direction D1. Direction D3 to which zone 10 is connected is set so that transport is performed through direction D3. Directions D2 and D4 to which no other zone Z is connected are set so that no transport is performed through directions D2 and D4. Such setting is previously stored, as direction setting information, in direction setting information storage 55 of direction changing module Mt.

The setting for the transport may include the directions toward which carry-in and carry-out is performed. In this case, for zone Z7, direction D1 may be set so that the carry-in operation is performed through direction D1.

Direction setting information storage 55 may also be included in local controller ZC of forward conveying module Ms. Local controller ZC of forward conveying module Ms may include direction setting information storage 55. In such a case, for zone Z2 for example, direction setting information storage 55 of local controller ZC in zone Z2 may store setting in which the carry-in operation is performed in direction D1 and the carry-out operation is performed in direction D2.

Program storage 59 previously stores a program to be executed by controller 50, and program identification information for identifying the program that is stored in program storage 59, i.e., identifying which one of first program P1 and second program P2 is stored in program storage 59.

Program storage 59 in forward conveying module Ms stores first program P1 and program identification information indicating first program P1. Program storage 59 in direction changing module Mt, which is described later, stores second program P2 and program identification information indicating second program P2. The program identification information may be a name, a code number, or a sign, of the program, for example.

Local controller ZC of forward conveying module Ms and local controller ZC of direction changing module Mt use the same hardware. Local controller ZC functions as local controller ZC for forward conveying module Ms by storing first program P1 in program storage 59, and functions as local controller ZC for direction changing module Mt by storing second program P2 in program storage 59.

The controller 50 includes for example: a CPU that executes a predetermined calculation; a RAM that stores data temporarily; a non-volatile storage element, such as a flash memory; a timer circuit; and peripheral circuits for them. State storage 54 is composed of the aforementioned RAM and so on. Setting value storage 58, direction setting information storage 55, and program storage 59 are composed of a non-volatile storage element and so on. The non-volatile storage element of the direction changing module Mt is also used as direction setting information storage 55.

Controller 50 executes first program P1 so as to function as drive controller 51a and motor connection detector 53, and executes second program P2 so as to function as drive controller 51b and motor connection detector 53. Hereinafter, drive controllers 51a and 51b are collectively referred to as drive controller 51.

Drive controller 51 controls driving of motor 61 via motor drive circuit 62, so as to control the transport of a conveyed object by means of own zone Z to which drive controller 51 belongs. Drive controller 51 drives motor 61 via motor drive circuit 62. Such operation is referred to simply as the driving of motor 61 by drive controller 51.

Receiving a carry-in permission signal indicating permission for the carry-in of a conveyed object from another zone adjacent to own zone (to which drive storage controller 51 belongs) at the downstream in the transport direction, drive storage controller 51 causes permission information indicating presence of the permission for the carry-in operation to be stored in state storage 54. If no carry-in permission signal is received, the permission information indicating absence of the permission for the carry-in operation is stored in state storage 54.

Receiving a carry-out request signal indicating a request for the carry-out of a conveyed object from another zone adjacent to the own zone at the upstream in the transport direction, drive controller 51 causes request information indicating presence of the request for carry-out operation to be stored in state storage 54. If no carry-out request signal is received, the request information indicating absence of the request for the carry-out operation is stored in state storage 54.

If inventory sensor 8 in own zone Z (to which drive storage controller 51 belongs) is turned OFF and the request for carry-out operation is present, drive controller 51 drives motor 61 to convey the conveyed object from an upstream zone into the own zone Z.

If inventory sensor 8 in the own zone Z is turned ON and the permission for carry-in operation is present, drive controller 51 drives motor 61 to convey the conveyed object in the own zone Z toward zone Z in the downstream side. If the carry-out request is also present at this time, a conveyed object from the upstream side is conveyed into the own zone Z while a conveyed object in the own zone Z is conveyed toward zone Z in the downstream side.

Drive controller 51b further controls drive roller 15 of main transport conveyer 11, roller 16 of subordinate transport conveyer 12, and elevator controller 21 so as to control the transport in each direction.

Driving controller 51 performs the transport control mentioned above based on carry-in timer value tin and carry-out timer value tout, which are stored in setting value storage 58. Drive controller 51 judges a jam error based on jam determination time tj stored in setting value storage 58. When a jam error occurs, drive controller 51 stops motor 61 to stop the transport of a conveyed object.

Drive controller 51b judges an abnormality in an operation of switching directions in direction changing module Mt, based on switch monitoring time tlm. If the abnormality occurs in the operation of switching directions, drive controller 51b stops module 61 to stop the transport of a conveyed object.

If any of carry-in timer value tin, carry-out timer value tout, jam determination time tj, and switch monitoring time tlm is improper, drive controller 51 cannot perform the transport control. This may cause the transport of a conveyed object to be stopped.

Initial value storage 39 in host controller 3 previously stores the respective proper values of carry-in timer value tin, carry-out timer value tout, jam determination time tj, and switch monitoring time tlm, as initial carry-in timer value tin0, initial carry-out timer value tout0, initial jam determination time tj0, and initial switch monitoring time tlm0, respectively. Initial carry-in timer value tin0, initial carry-out timer value tout0, jam determination time tj0, and initial switch monitoring time tlm0 correspond to an example of the initial timer value.

In forward conveying module Ms (FIG. 8), motor 61 drives drive roller 5a (motor 61 is an internal motor of drive roller 5a). Although FIG. 8 shows a single motor block 60, the number of motor block(s) 60 corresponds to the number of motor 61 used for transport driving. In the second forward zone provided with two drive rollers 5a, two motor blocks 60 are provided.

Components other than motor 61 in motor block 60 may be previously prepared in plural numbers even in the first forward zone, and only the number of motors 61 may be increased or decreased depending on the necessity. This improves a rate of sharing the components other than motor 61 in motor blocks 60, for zones Z having the different number of motor(s) 61 to be used.

Direction changing module Mt (FIG. 9) includes two motor blocks 60. Motor 61 in one of two motor blocks 60 drives drive roller 15 in main transport conveyer 11, and motor 61 in the other motor block 60 drives roller 16 in subordinate transport conveyer 12.

Motor drive circuit 62 is a so-called motor driver circuit. Motor drive circuit 62 drives motor 61 in accordance with a control signal from controller 50.

Figure 10:
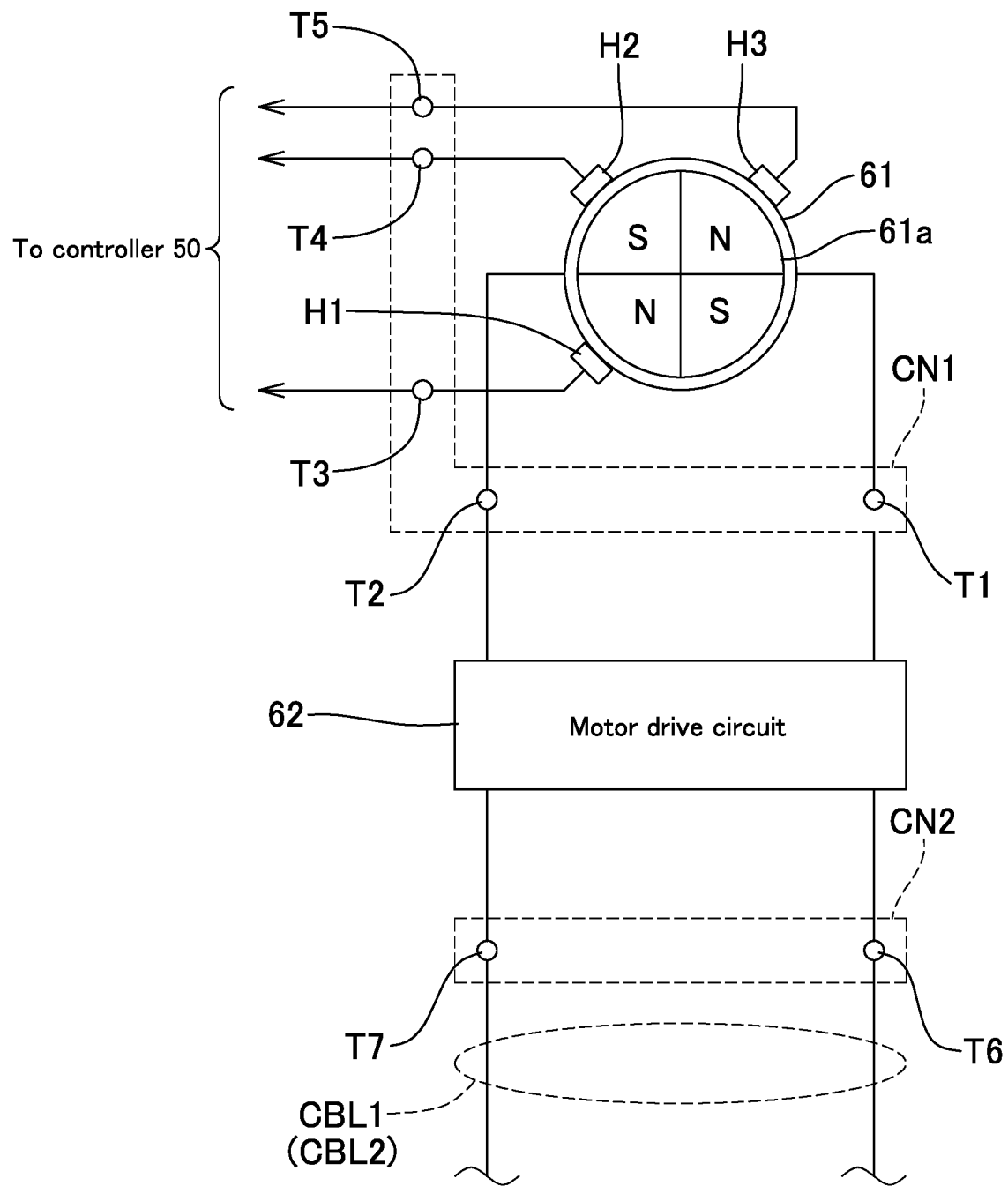
FIG. 10 is an explanatory diagram typically showing a motor block shown in FIGS. 8 and 9.
Figure 11:
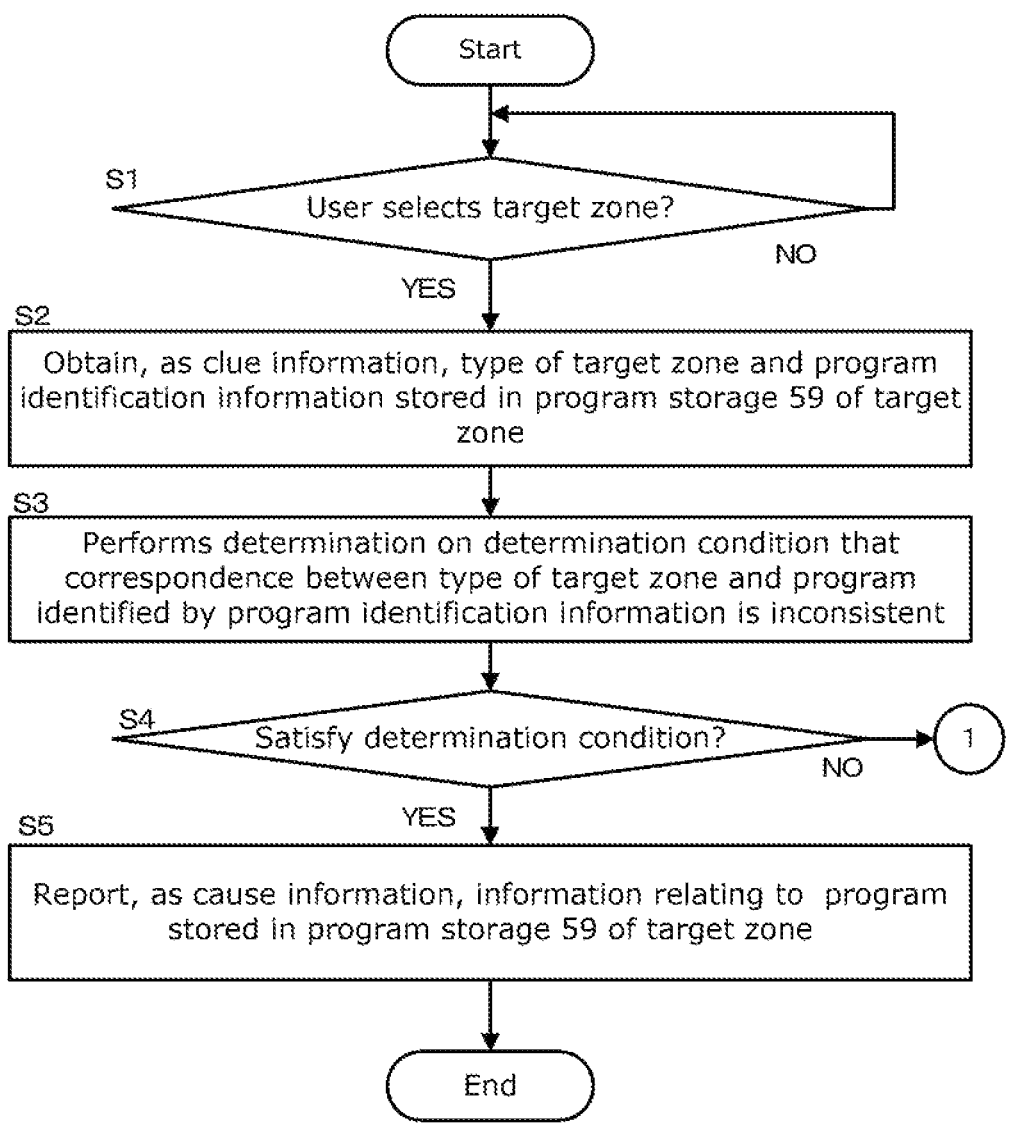
FIG. 11 is a flowchart showing an exemplary operation of a conveyer system, using a program for a cause information report device according to an embodiment of the present invention.
Figure 12:
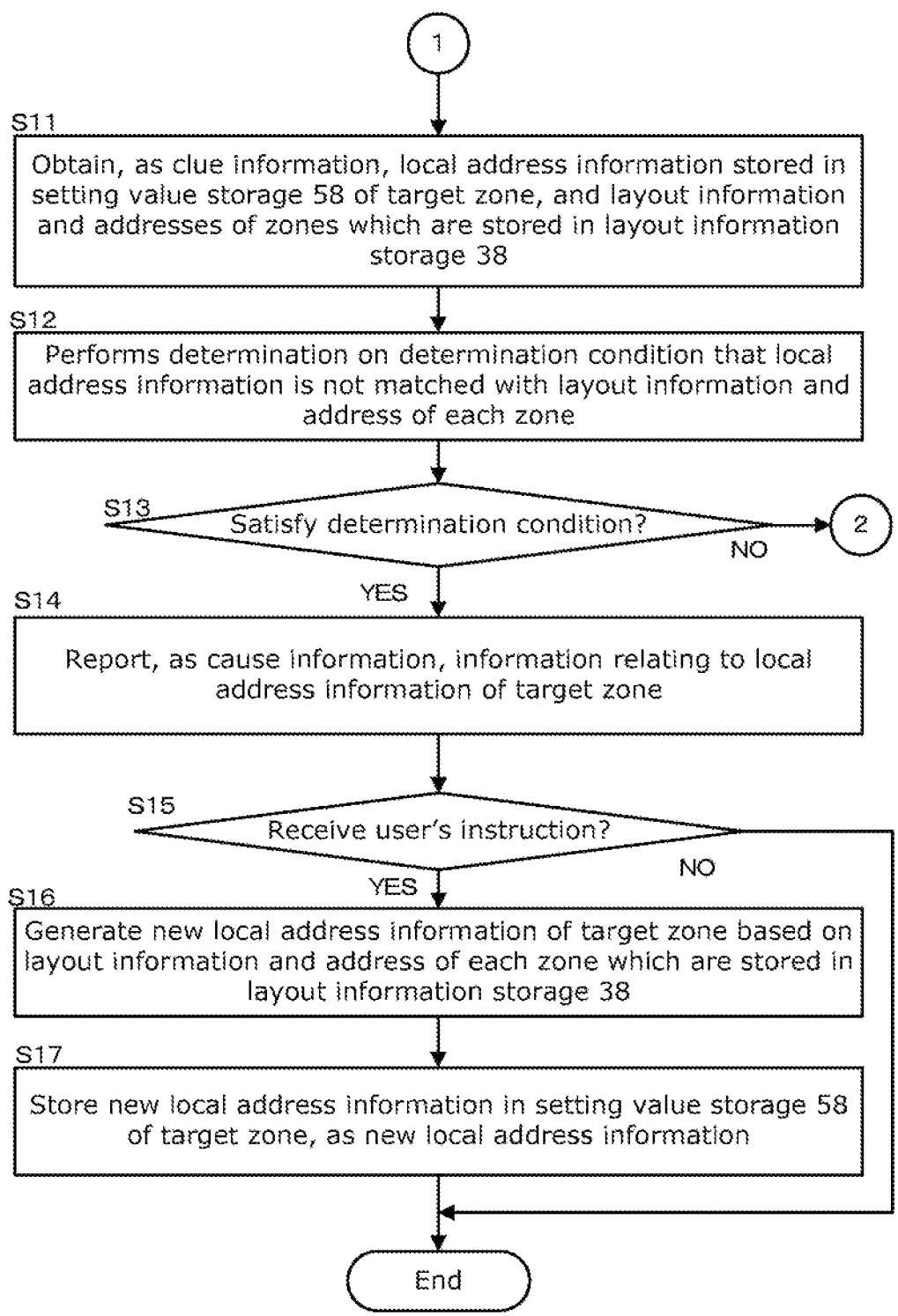
FIG. 12 is a flowchart showing an exemplary operation of the conveyer system, using the program for the cause information report device according to the embodiment of the present invention.
Figure 13:
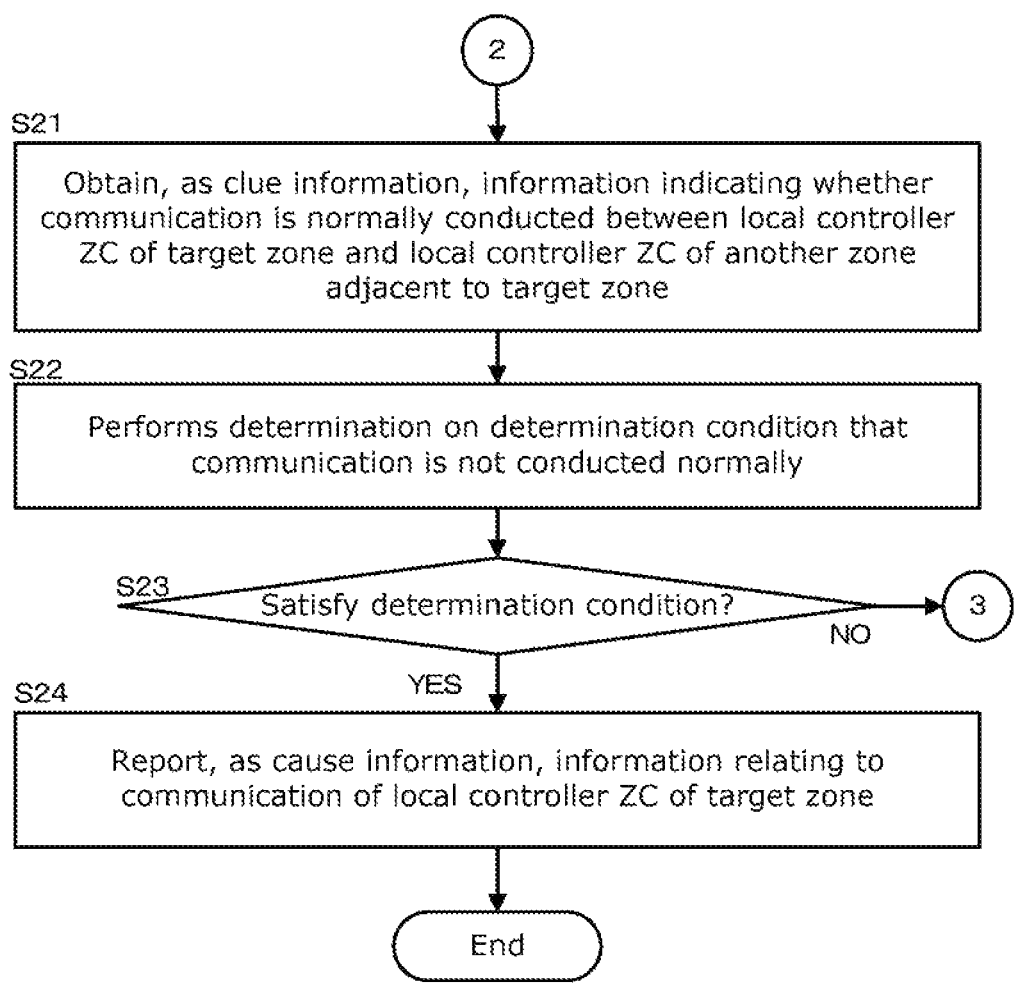
FIG. 13 is a flowchart showing an exemplary operation of the conveyer system, using the program for the cause information report device according to the embodiment of the present invention.
Figure 14:
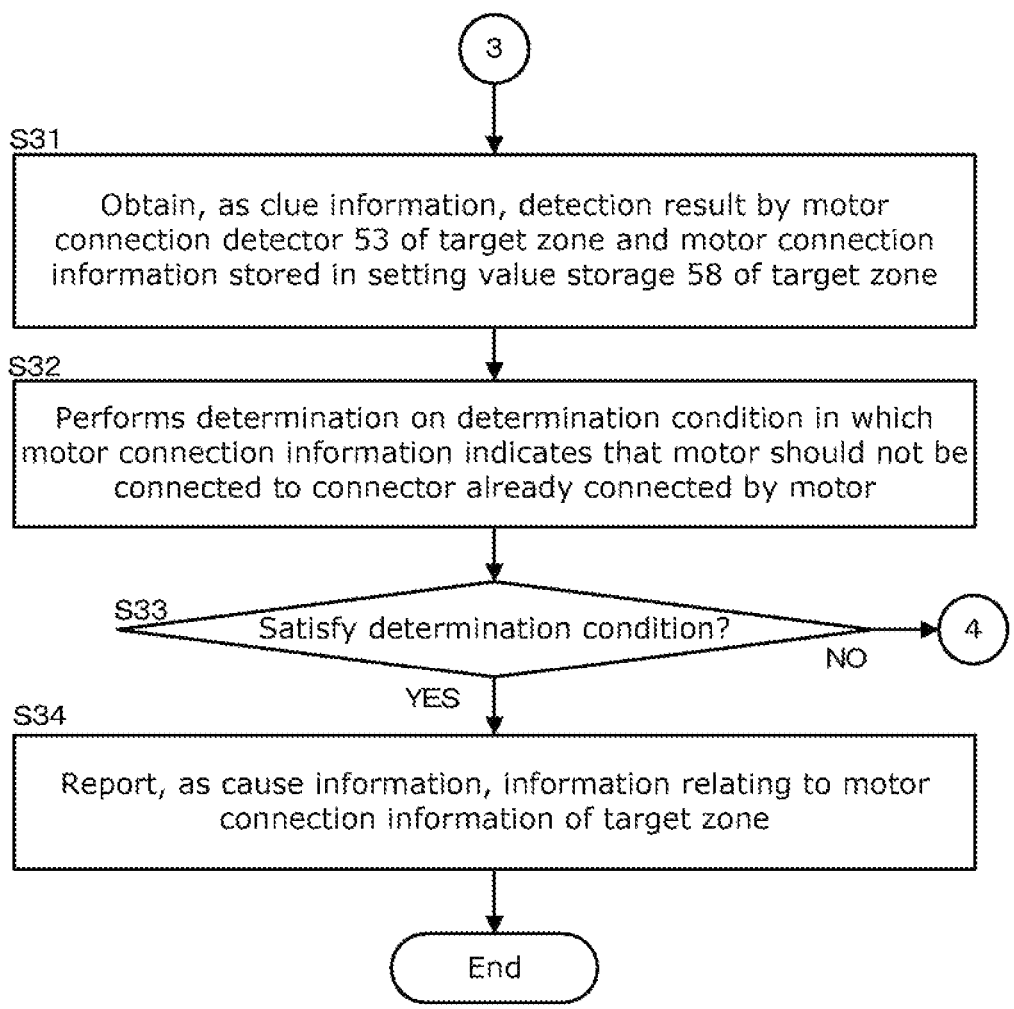
FIG. 14 is a flowchart showing an exemplary operation of the conveyer system, using the program for the cause information report device according to the embodiment of the present invention.
Figure 15:
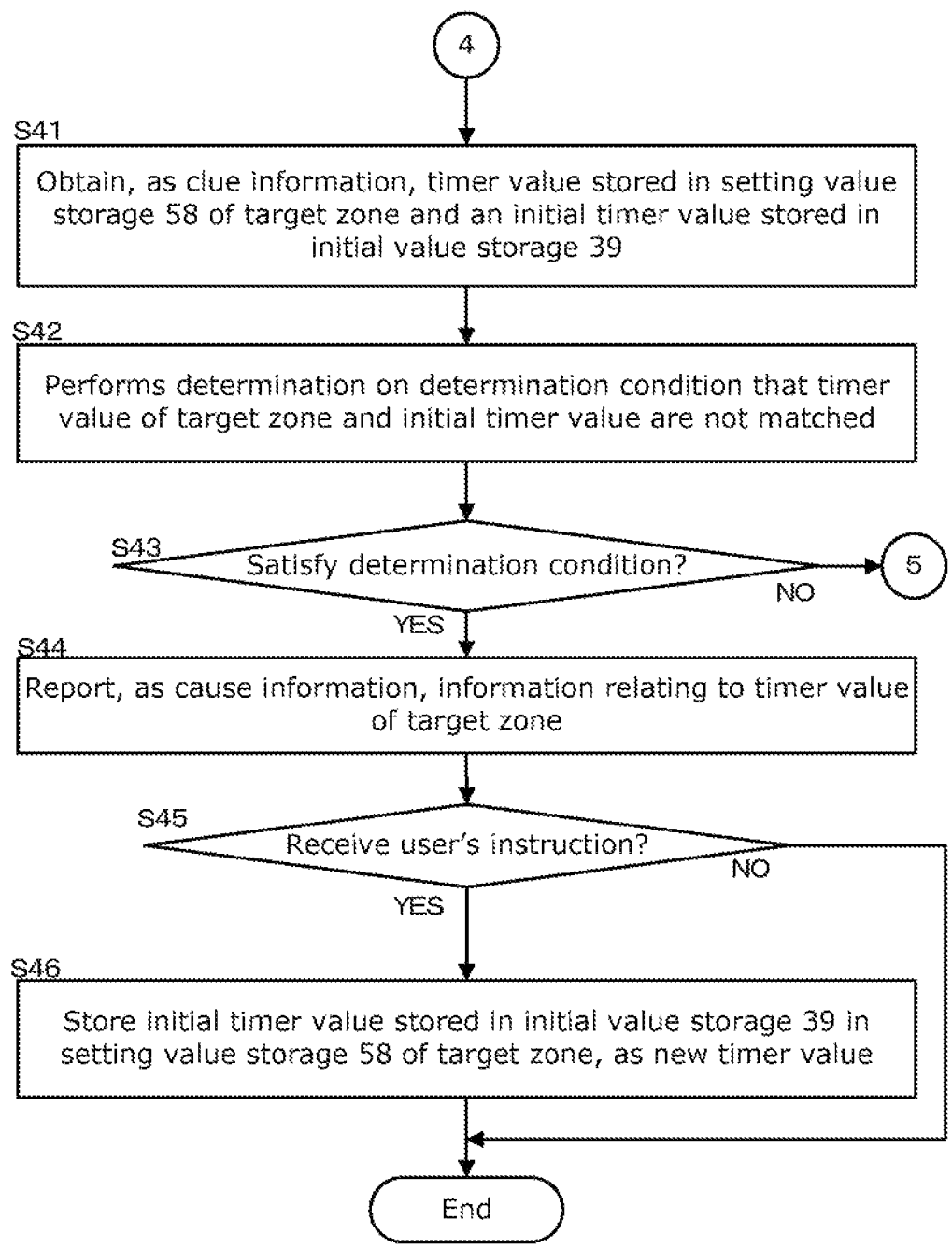
FIG. 15 is a flowchart showing an exemplary operation of the conveyer system, using the program for the cause information report device according to the embodiment of the present invention.
Figure 16:
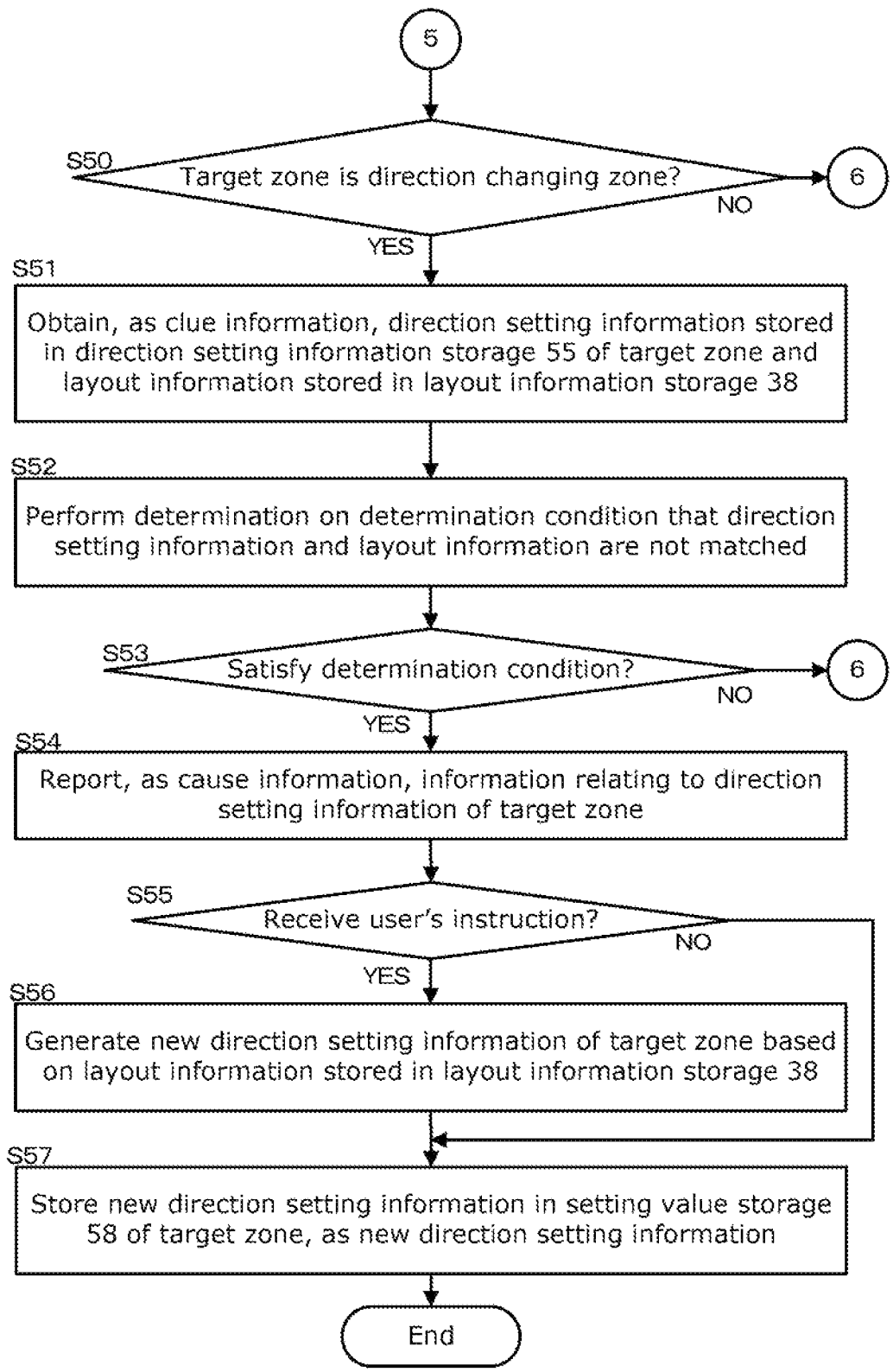
FIG. 16 is a flowchart showing an exemplary operation of the conveyer system, using the program for the cause information report device according to the embodiment of the present invention.
Figure 17:
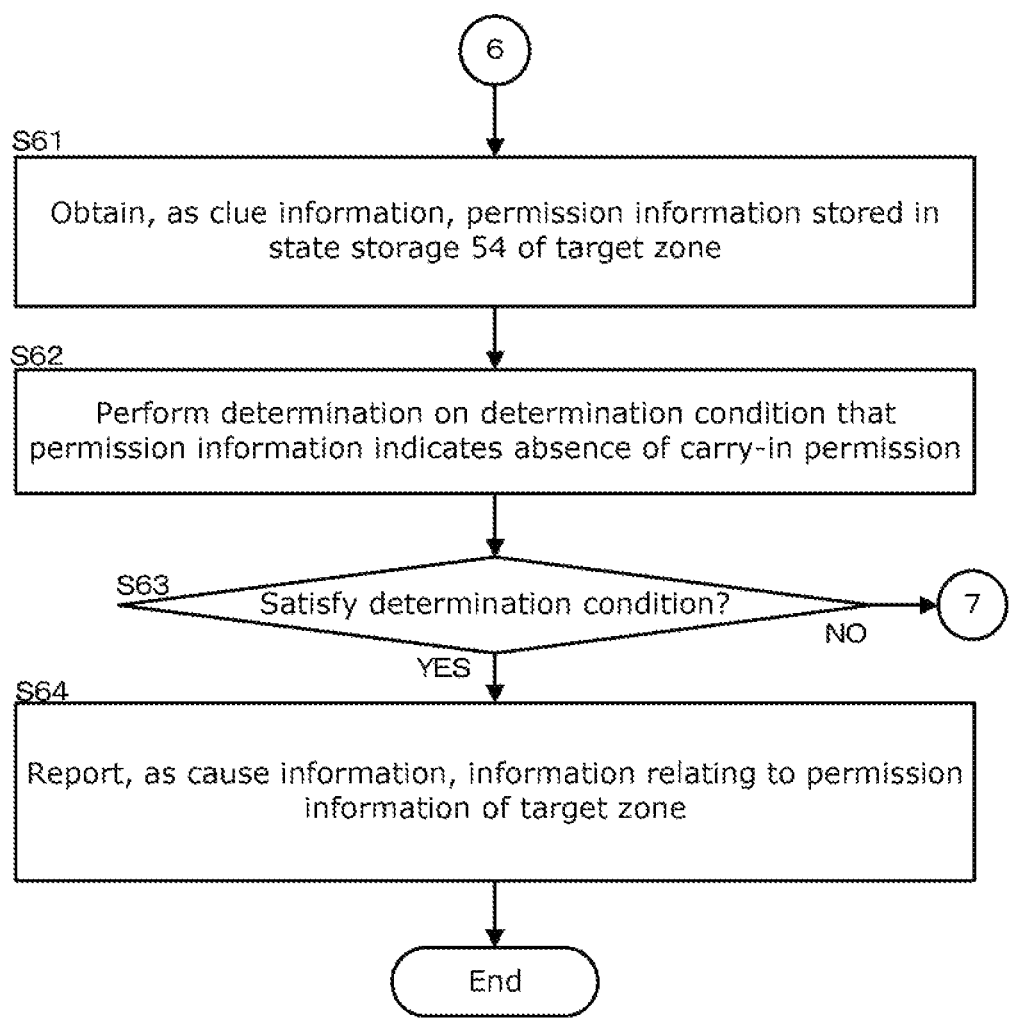
FIG. 17 is a flowchart showing an exemplary operation of the conveyer system, using the program for the cause information report device according to the embodiment of the present invention.
Figure 18:
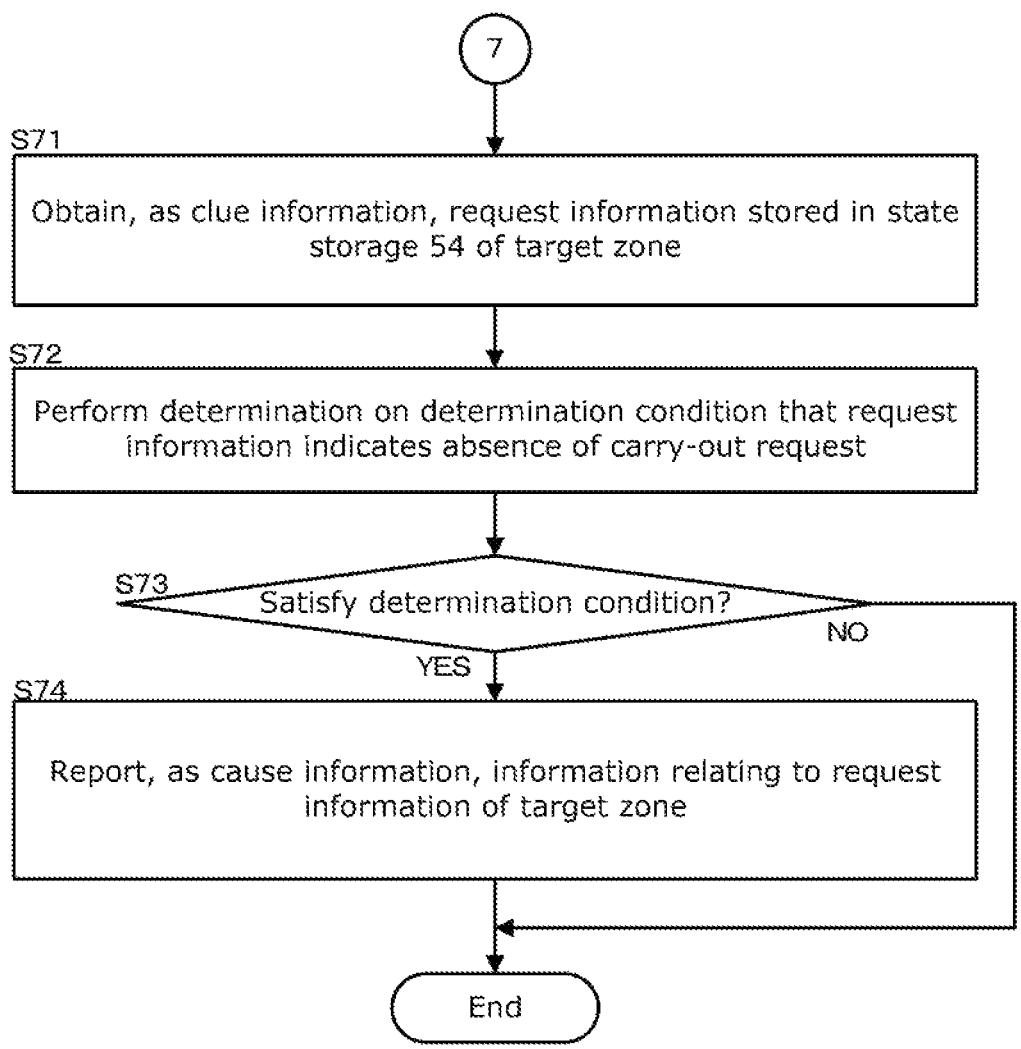
FIG. 18 is a flowchart showing an exemplary operation of the conveyer system, using the program for the cause information report device according to the embodiment of the present invention.

FIG. 10 is an explanatory diagram typically showing motor block 60 shown in FIGS. 8 and 9. Motor 61 has one terminal connected to motor drive circuit 62 via terminal T1 of connector CN1, and the other terminal connected to motor drive circuit 62 via terminal T2 of connector CN1.

Motor drive circuit 62 is connected to power source PS1 or power source PS2 through terminals T6 and T7 of connector CN2 and one of power source cable CBL1 and power source cable CBL2. Motor drive circuit 62 applies switching or the like to driving source voltage Vd supplied from power source PS1 or power source PS2 in accordance with a control signal from controller 50, and supplies the resultant voltage to motor 61.

In FIG. 10, motor 61 is cut in the perpendicular direction to the axial direction. The polarities of the outer peripheral surface of rotor 61a of motor 61 are shown in N and S. Hall effect elements H1, H2, and H3 are arranged so that Hall effect elements H1 and H3 face magnets having the polarity same as that of rotor 61a, and Hall effect element H2 faces a magnet having the polarity different from the polarity of the magnets which Hall effect elements H1 and H3 face. Hall effect elements H1, H2, and H3 are connected to controller 50 through terminals T3, T4, and T5 of connector CN1.

With this constitution, when Hall effect elements H1, H2, and H3 detect the N pole and output signals at a level H, for example, the output signals from Hall effect elements H1, H2, and H3 become (H, L, H) in the state shown in FIG. 10. If motor 61 rotates, the output signals from Hall effect elements H1, H2, and H3 alternately repeat a signal pattern of (H, L, H) and a signal pattern of (L, H, L), i.e., signal patterns of (L, H, L), (H, L, H), (L, H, L), (H, L, H), and the like is repeated. Hall effect elements H1, H2, and H3 may of course output a signal at the level H, when detecting the S pole.

Motor connection detector 53 determines that connector CN1 is not connected when Hall effect elements H1, H2, and H3 all output the same signal, i.e., the signal pattern is the (L, L, L) or (H, H, H). In other words, when connector CN1 is connected and output signals from Hall effect elements H1, H2, and H3 are outputted to controller 50, the output signals from Hall effect elements H1, H2, and H3 should be (H, L, H) or (L, H, L). Accordingly, when Hall effect elements H1, H2, and H3 all output the same signal, motor connection detector 53 can determine that connector CN1 of motor 61 is not connected.

Here, the case in which connector CN1 of motor 61 is not connected includes a contact failure in connector CN1.

Elevator controller 21 of direction changing module Mt is composed of a so-called microcomputer. Elevator controller 21 drives elevator motor 19 in accordance with a direction indication signal, from controller 50, which indicates an instruction for the transport direction, to cause direction changing module Mt to change its orientation between the straight orientation and the direction changing orientation. Elevator controller 21 outputs, to controller 50, a switch response signal indicating that the change in transport direction is completed, after the completion of the orientation change.

Elevator controller 21 corresponds to an example of a switch response signal outputter. A switch response signal may also serve as a signal indicating the transport direction after the orientation change, i.e., a signal indicating the orientation regarding which one of main transport conveyer 11 and subordinate transport conveyer 12 is above the other one.

After a direction instruction signal is outputted, the switch response signal may not be received until the switch monitoring time tlm elapses. In such a case, drive controller 51b determines the jam error and stops the transport.

Next, operation of conveyer system 1 configured as above is described. FIGS. 11 to 18 are flowcharts showing an exemplary operation of conveyer system 1 using a program for the cause information report device according to an embodiment of the present invention.

If a conveyed object loaded on conveyed device 2, for example, stops without being transported, a user first operates keyboard 35, mouse 36, or the like to select zone Z where the conveyed object is stopped for investigating a cause of the stop (YES in Step S1).

Then, report processor 302 of host controller 3 identifies the type of a target zone selected in Step S1 with reference to zone type information stored in layout information storage 38, and obtains, as clue information, the type of the target zone and program identification information stored in program storage 59 of the target zone (Step S2: (a1)).

Report processor 302 does not necessarily refer to the zone type information stored in layout information storage 38, but may obtain the type of a target zone by directly accessing local controller ZC of the target zone.

Next, report processor 302 performs determination on a determination condition in which the correspondence between the type of a target zone obtained in Step S2 and the program identified by the program identification information is not matched (Step S3: (a2)).

Then, if the determination condition in Step S3 is satisfied, i.e., the correspondence between the type of the target zone and the program identified by the program identification information are not matched (YES in Step S4), report processor 302 reports, as the cause information, information relating to the program stored in program storage 59 in the target zone (Step S5 (a3)).

The reports by report processor 302 can be exhibited by various report methods, such as being displayed on display 34, and being transmitted to the exterior through communication. The same should be applied to reports described below.

Regarding information relating to the program stored in program storage 59 in the target zone, various information can be reported as the cause information. The various information includes, for example, names of the programs stored in program storage 59 of the target zone, which include first program P1 and second program P2, a message of the inappropriateness of the program stored in program storage 59 of the target zone, a message of guiding a user to store a correct program in program storage 59 of the target zone, and so on.

As mentioned above, it is necessary for program storage 59 to store a program corresponding to the type of the concerned zone. For example, it is necessary for program storage 59 to store first program P1 in correspondence with the forward zone and second program P2 in correspondence with the direction changing zone. If the correspondence is wrong, local controller ZC does not function normally. Accordingly, a conveyed object cannot be transported in the concerned zone, and the transport operation on the conveyed object may stop there.

As mentioned above, if the type of the target zone and the program identified by the program identification information are not matched (YES in Step S4), information relating to the program stored in program storage 59 of the target zone is reported as the cause information (Step S5 (a3)). With this operation, if conveyer device 2 stops, information relating to the cause of the stop can be reported to a user. As a result, a user can easily resolve the cause of the stop in the conveyer.

On the other hand, if the determination condition is not satisfied in Step S4, i.e., if the correspondence between the type of a target zone and the program identified by the program identification information is consistent (NO in Step S4), report processor 302 causes the processing to be shifted to Step S11 for investigating another cause.

In Step S11, report processor 302 obtains, as the clue information, local address information stored in setting value storage 58 of the target zone, and layout information and addresses of the respective zones which are stored in layout information storage 38 (Step S11: (b1)).

Figure 19:
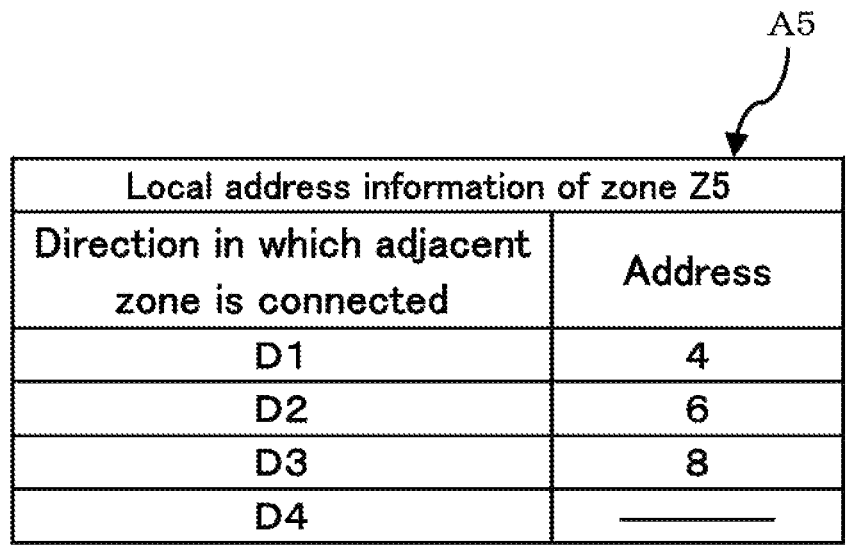
FIG. 19 is an explanatory diagram showing, in a tabular format, an example of local address information stored in a setting value storage of each of the zones.

First, the local address information stored in setting value storage 58 of each zone is described. FIG. 19 is an explanatory diagram showing, in a tabular format, an example of local address information A5 stored in setting value storage 58 of zone Z5.

Zone Z5 is adjacent to zone Z4 in direction D1, to zone Z6 in direction D2, and to zone Z8 in direction D3, as shown in FIG. 1. In local address information A5, the directions D1, D2, and D3 are respectively associated with addresses 4, 6, and 8, in response to such layout of zones Z. In local address information of another zone Z, the directions with respect to own zone, which are respectively adjacent to other zones Z, are associated with addresses of the adjacent zones, in a similar manner as the local address information A5.

Although the local address information in FIG. 19 is shown without distinguishing sending information from receiving information, the local address information may include a data table for sending and a data table for receiving.

Then, report processor 302 performs determination on a determination condition in which the local address information is not matched with the layout information and the address of each zone (Step S12: (b2)).

Layout information storage 38 stores layout information indicating the layout of zones Z1 to Z11 as shown in FIG. 1, and the address information indicating the addresses 1 to 11 of zones Z1 to Z11. Thus, if the target zone is zone Z5, for example, report processor 302 can perform the determination on the consistency by collating the local address information A5 shown in FIG. 19 with the address information and the layout information shown in FIG. 1.

Then, if the determination condition is satisfied, i.e., the local address information does not match with the layout information and the address of each zone (YES in Step S13), report processor 302 reports, as the cause information, information relating to the local address information for the target zone (Step S14: (b3)).

The information relating to the local address information for the target zone may be, for example, the local address information itself stored in setting value storage 58 of the target zone, may be a message indicating that the local address information for the target zone is improper, or may be a message guiding, to a user, correction of the local address information for the target zone. Various information can be reported as the cause information.

Local communication unit 57 of each zone refers to setting value storage 58 of own zone to which local communication unit 57 belongs, and performs communication with another zone, based on the local address information stored in setting value storage 58. Accordingly, if the local address information of the own zone is improper, time-out may occur or a wrong response is replied, in the communication with another zone. This refrains local communication unit 57 from normal communication with other zones.

As a result of the communication with another zone, local communication unit 57 sends, to drive controller 51, communication status information that indicates whether normal communication can be conducted. Drive controller 51 allows the communication status information to be stored in state storage 54.

Not being able to communicate with another zone, drive controller 51 cannot receive a carry-out request from an upstream zone and a carry-in permission from a downstream zone, thereby causing the transport to be stopped.

Accordingly, if the local address information is not matched with the layout information and the addresses of the respective zones (YES in Step S13), information relating to the local address information of a target zone is reported (Step S14 (b3)). With this operation, if conveyer device 2 stops, information relating to a cause of the stop can be reported to a user. As a result, the user can easily resolve the cause of the stop of the conveyer.

If a user inputs, for example, an instruction of automatic correction using keyboard 35 or mouse 36 (YES in Step S15), automatic corrector 303 generates another local address information for the target zone based on the layout information and the address of each zone which are stored in layout information storage 38 (Step S16: (b4)).

According to the layout information and the address information as shown in FIG. 1, if the target zone is zone Z5, for example, zone Z4 having address 4 is adjacent to zone 5 in direction D1, zone 6 having address 6 in direction D2, and zone 8 having address 8 in direction D3. Therefore, automatic corrector 303 can generate correct local address information A5 shown in FIG. 19, based on the layout information and the address of each zone which are stored in layout information storage 38.

Then, automatic corrector 303 causes the new local address information generated in Step S16 to be stored in setting value storage 58 of the target zone, as new local address information (Step S17: (b4)).

According to Steps S16 and S17, occurrence cause of the conveyer stop can be automatically resolved.

In contrast, if the determination condition is not satisfied in Step S13, i.e., the local address information is not matched with the layout information and the address of each zone (NO in Step S13), report processor 302 allows the processing to be shifted to Step S21 for investigating another cause.

In Step S21, report processor 302 accesses status storage 54 of the target zone, and refers to the communication status information stored in state storage 54, for example, to obtain, as the clue information, information indicating whether communication is normally conducted between local controller ZC of the target zone and local controller ZC of another zone adjacent to the target zone (Step S21: (c1)).

Then, report processor 302 performs determination on a determination condition in which the clue information obtained in Step S21 indicates that communication is not conducted normally (Step S22: (c2)).

Then, if the determination condition is satisfied, i.e., the communication is not conducted normally (YES in Step S23), report processor 302 reports, as the cause information, information relating to the communication of local controller ZC of the target zone (Step S24: (c3)).

The information relating to the communication of local controller ZC of the target zone may be, for example, a message indicating that local communication unit 57 of local controller ZC is defective, or may be a message indicating that communication cable 4 is defective. Various information relating to the communication of local controller ZC of the target zone can be reported as the cause information.

Accordingly, if conveyer device 2 stops, information relating to the cause of the stop can be reported to a user. As a result, the user can easily resolve the cause of the stop of the conveyer.

In contrast, if the determination condition is not satisfied in Step S23, i.e., the communication is normally conducted (NO in Step S23), report processor 302 allows the processing to be shifted to Step S31 for investigating another cause.

In Step S31, report processor 302 accesses local controller ZC of the target zone, to obtain, as the clue information, the detection result obtained by motor connection detector 53 in the target zone and motor connection information stored in setting value storage 58 in the target zone (Step S31: (d1)).

Then, report processor 302 performs determination on a determination condition in which the motor connection information indicates that a motor should not be connected to connector CN1 that is detected, by motor connection detector 53, as being already connected by a motor (Step S32(d2)).

Then, if the determination condition is satisfied, i.e., the setting in which the motor should not be connected is set on connector CN1 that is determined as being connected by motor 61 (YES in Step S33), report processor 302 reports, as the cause information, information relating to the motor connection information for the target zone (Step S34: (d3)).

The information relating to the motor connection information for the target zone may be, for example, the motor connection information itself stored in setting value storage 58 of the target zone, or may be a message indicating that the motor connection information stored in setting value storage 58 of the target zone is improper. Various information relating to the motor connection information for the target zone can be reported as the cause information.

When performing driving control on motor 61, drive controller 51 refers to the motor connection information stored in setting value storage 58, performs control on only motor 61 connected to a port (connector CN1) that is set to be connected by motor 61, and does not perform control on motor 61 connected to a port (connector CN1) that is not set to be connected by motor 61. Accordingly, if the setting in which a motor should not be connected is set to connector CN1 that is detected as being connected by motor 61 (YES in Step S33), motor 61 connected to the concerned connector CN1 is not driven by drive controller 51. Accordingly, transport is not performed by the concerned motor 61.

Accordingly, if the setting in which a motor should not be connected is set to connector CN1 that is detected as being connected by motor 61 (YES in Step S33), information relating to the motor connection information for the target zone is reported as the cause information (Step S34 (d3)). With this operation, information relating to a cause of the stop of conveyer device 2 can be reported to a user. As a result, the user can easily resolve the cause of the stop of the conveyer.

On the other hand, if the determination condition is not satisfied in step S33, i.e., if the setting in which a motor should be connected is set to connector CN1 detected as being connected by motor 61 (NO in Step S33), report processor 302 causes the processing to be shifted to Step S41 for investigating another cause.

In Step S41, report processor 302 accesses setting value storage 58 of the target zone, to obtain, as the clue information, a timer value stored in setting value storage 58 and an initial timer value stored in initial value storage 39 of host controller 3 (Step S41: (e1)).

Then, report processor 302 performs determination on a determination condition in which the timer value of the target zone and the initial timer value, which are obtained in Step S41, are not matched (Step S42: (e2)).

Then, if the determination condition is satisfied, i.e., the timer value of the target zone and the initial timer value are not matched (YES in Step S43), information relating to the timer value of the target zone is reported as the cause information (Step S44: (e3)).

The information relating to the timer value of the target zone may be a timer value itself stored in setting value storage 58 of the target zone (carry-in timer value tin, carry-out timer value tout, jam determination time tj, and switch monitoring time tlm), or may be a message indicating that any of the timer values is improper. Various information relating to the timer value can be reported as the cause information.

As described above, if a value of the timer value is improper, drive controller 51 cannot perform appropriate transport control. This may cause the transport of a conveyed object to be stopped.

Accordingly, if a timer value of the target zone and the initial timer value are not matched (YES in Step S43), the timer value in the target zone may be improper. Thus, the information relating to the timer value of the target zone is reported as the cause information (Step S44 (e3)). With this operation, if conveyer device 2 stops, information relating to a cause of the stop can be reported to a user. As a result, the user can easily resolve the cause of the stop of the conveyer.

If a user inputs, for example, an instruction of the automatic correction using keyboard 35 or mouse 36 (YES in Step S45), automatic corrector 303 causes the initial timer value stored in initial value storage 39 to be stored, as a new timer value, in setting value storage 58 of the target zone (Step S46: (e4)). With these operations, an occurrence cause of the conveyer stop can be automatically resolved.

In contrast, if the determination condition is not satisfied in Step S43, i.e., the timer value of the target zone and the initial timer value are matched (NO in Step S43), report processor 302 allows the processing to be shifted to Step S50 for investigating another cause.

In Step S50, report processor 302 specifies a zone type of the target zone with reference to the zone type information stored in layout information storage 38 of the target zone, to verify whether the target zone is the direction changing zone (Step S50). Report processor 302 is not necessarily limited to refer to the zone type information stored in layout information storage 38, but may obtain the type of the target zone by directly accessing local controller ZC of the target zone.

If the target zone is not the direction changing zone (NO in Step S50), report processor 302 allows the processing to be shifted to Step S61 for investigating another cause.

On the other hand, the target zone is the direction changing zone (YES in Step S50), report processor 302 obtains, as the clue information, direction setting information stored in direction setting information storage 55 of the target zone and the layout information stored in layout information storage 38 (Step S51: (f1)).

Then, report processor 302 performs the determination on a determination condition in which the direction setting information and the layout information in the target zone are not matched (Step S52: (f2)). Regarding the layout information indicating the zone layout shown in FIG. 1, zone Z5 is, for example, connected to zones Z6 and Z8 in directions D2 and D3 respectively, and is not connected to another zone in direction D4. Accordingly, it is necessary for the direction setting information of zone Z5 to be set such that the transport is performed in directions D2 and D3 and no transport is performed in direction D4.

If it is set in the direction setting information of zones Z5 that transport is performed in directions D2 and D3, and is not performed in direction D4, the direction setting information and the layout information are matched. On the other hand, if such setting is not set, the direction setting information and the layout information are not matched. If the setting in which the transport is performed in direction D2 is not set in the direction setting information, for example, the transport is not performed in direction D2 in zone Z5, thereby stopping the transport.

Then, if the determination condition is satisfied, i.e., the direction setting information and the layout information in the target zone are not matched (YES in Step S53), report processor 302 reports, as the cause information, the information relating to the direction setting information for the target zone (Step S54: (f3)).

The information relating to the direction setting information for the target zone may be, for example, the direction setting information itself of the target zone, may be a message indicating that the direction setting information for the target zone is improper, may be a message guiding to a user correction of the direction setting information for the target zone. Thus, various information can be reported, as the cause information.

Accordingly, the information relating to the cause can be reported to a user. As a result, the user can easily resolve the cause of the stop of the conveyer.

If local controller ZC of forward conveying module Ms is provided with direction setting information storage 55, processing in Step S50 may not be implemented and shifted to Step S51 with NO in step S43. With these operations, even if the target zone is the forward zone, it is possible to verify whether the direction setting information is appropriately set.

If a user inputs an instruction of the automatic correction using keyboard 35 or mouse 36 (YES in Step S55), for example, automatic corrector 303 generates new direction setting information for the target zone based on the layout information stored in layout information storage 38 (Step S56: (f4)).

According to the layout information shown in FIG. 1, in a case where the target zone is zone Z5, for example, a conveyed object will not be transported reversely in direction D1. In addition, zone Z6 having address 6 is adjacent to zone 5 in direction D2, and zone Z8 having address 8 is adjacent to zone 5 in direction D3. Therefore, report processor 302 can generate new direction setting information in which the transport is performed in directions D2 and D3 and is not performed in directions D1 and D4.

Then, automatic corrector 303 causes the new direction setting information generated in Step S56 to be stored in setting value storage 58 of the target zone, as new direction setting information (Step S57: (f4)).

According to Steps S56 and S57, the occurrence cause of the conveyer stop can be automatically resolved.

In contrast, if the determination condition is not satisfied in Step S53, i.e., the direction setting information and the layout information for the target zone are matched (NO in Step S53), report processor 302 allows the processing to be shifted to Step S61 for investigating another cause.

In Step S61, report processor 302 obtains, as the clue information, the permission information stored in state storage 54 of the target zone (Step S61: (g1)).

Then, report processor 302 performs determination on a determination condition in which the permission information obtained in Step S61 indicates absence of the permission (Step S62: (g2)).

Then, if the determination condition is satisfied, i.e., the permission information for the target zone indicates the absence of the permission (YES in Step S63), report processor 302 reports, as the cause information, the information relating to the permission information for the target zone (Step S64: (g3)).

The information relating to the permission information for the target zone may be, for example, the permission information itself stored in state storage 54 of the target zone, or may be a message indicating that a carry-in permission from a zone downstream of the target zone is not obtained. Various information relating to the permission information for the target zone can be reported as the cause information.

If inventory sensor 8 in own zone Z to which drive controller 51 belongs is turned ON and the carry-in permission is present as mentioned above, drive controller 51 drives motor 61 to transport the conveyed object in the own zone Z to downstream zone Z. Accordingly, when the permission information indicates absence of the carry-in permission (YES in Step S63), the conveyed object is not transported even with inventory sensor 8 of the own zone Z being turned ON.

Accordingly, if the permission information indicates the absence of the carry-in permission (YES in Step S63), information relating to the permission information for the target zone is reported as the cause information (Step S64 (g3)). With this operation, the information relating to a cause of the stop of conveyer device 2 can be reported to a user. As a result, the user can easily resolve the cause of the stop of the conveyer.

In contrast, if the determination condition is not satisfied in Step S63, i.e., the permission information for the target zone indicates presence of the carry-in permission (NO in Step S63), report processor 302 allows the processing to be shifted to Step S71 for investigating another cause.

In Step S71, report processor 302 obtains, as the clue information, request information stored in state storage 54 of the target zone (Step S71: (h1)).

Then, report processor 302 performs the determination on a determination condition in which the request information obtained in Step S71 indicates absence of a carry-out request (Step S72: (h2)).

Then, if the determination condition is satisfied, i.e., the request information for the target zone indicates the absence of the carry-out request (YES in Step S73), report processor 302 reports, as the cause information, information relating to the request information for the target zone (Step S74: (h3)), and terminates the processing.

The information relating to the request information for the target zone may be, for example, the request information itself stored in state storage 54 of the target zone, or may be a message indicating that the carry-out request is not obtained from a zone upstream of the target zone. Various information relating to the request information for the target zone can be reported as the cause information.

If inventory sensor 8 in own zone Z to which drive controller 51 belongs is turned OFF and the carry-out request is present, as mentioned above, drive controller 51 drives motor 61 to allow a conveyed object transported from an upstream zone to be transported into the own zone Z. Accordingly, if the request information indicates absence of the carry-out request (YES in Step S73), the conveyed object is not transported in the own zone, even with inventory sensor 8 of the own zone Z being turned OFF.

Accordingly, if the request information for the target zone indicates the absence of the carry-out request (YES in Step S73), the information relating to the request information for the target zone is reported as the cause information (Step S74 (h3)). With this operation, information relating to the cause of the stop of conveyer device 2 can be reported to a user. As a result, the user can easily resolve the cause of the stop of the conveyer.

In processing in Steps S1 to S74, determination relating to a phenomenon in which conveyer system 1 itself involves some kind of problem among causes of non-transport of a conveyed object is preferentially performed in Steps S1 to S57 in advance. The problem includes: improperness in information of the set value and program which are stored in setting value storage 58, program storage 59, and direction setting information storage 55; impossibility in communication; and so on. Thereafter, it is determined, in Steps S61 to S71, as to whether the condition for performing the transport by drive controller 51 is established irrespective of the presence/absence of the abnormality, thereby efficiently reporting information relating to the cause of the stop of conveyer device 2 to a user.

The processing in Steps S11 to S74 may not be implemented. The processing in Steps S11 to S17 may be implemented after "YES" in Step S1. The processing in Steps S11 to S14 may be implemented after "YES" in Step S1. The processing in Steps S21 to S24 may be implemented after "YES" in Step S1. The processing in Steps S31 to S34 may be implemented after "YES" in Step S1. The processing in Steps S41 to S46 may be implemented after "YES" in Step S1. The processing in Steps S41 to S44 may be implemented after "YES" in Step S1. The processing in Steps S50 to S57 may be implemented after "YES" in Step S1. The processing in Steps S50 to S54 may be implemented after "YES" in Step S1. The processing in Steps S61 to S64 may be implemented after "YES" in Step S1. The processing in Steps S71 to S74 may be implemented after "YES" in Step S1. The implementing order of the processing in these steps may be replaced with one another.

Analysis history recording processor 304 associates the clue information obtained in Steps S2, S11, S21, S31, S41, S51, S61, and S71 with the determination results for the determination conditions obtained in Steps S3 to S4, S12 to S13, S22 to S23, S32 to S33, S42 to S43, S52 to S53, S62 to S63, and S72 to S73, so as to allow the associated information to be cumulatively stored in analysis history storage 40 as analysis history.

The analysis history thus stored in analysis history storage 40 can be used for analyzing the cause of the non-transport of a conveyed object, and easily used for the improvement of conveyer system 1.

According to such a conveyor system, a cause information report device, a program for the cause information report device, and a computer-readable recording medium recording the program for the cause information report device, it is easy to notify a user, when the conveyer device stops, of information relating to the cause of the stop.

The present application is based on Japanese patent application No. 2019-073018 filed on Apr. 5, 2019, and the contents thereof is involved in the present application. Specific embodiments and examples described in "Description of Embodiments" merely clarify technique of the present invention, and the present invention should not be interpreted narrowly with being limited in such specific examples.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

REFERENCE SIGNS LIST

1 Conveyer system
2 Conveyer device

3 Host controller (cause information report device)
4 Communication cable
5 Transport roller
5a Drive roller
5b Driven roller
6, 6 Side frame
7 Transmission belt
8 Inventory sensor
9 Boundary sensor
11 Main transport conveyer
12 Subordinate transport conveyer
13 Elevator device
14 Belt
15 Drive roller
16 Roller
17 Belt
18 Direct-acting cam
19 Elevator motor
20 Rack and pinion mechanism
21 Elevator controller
30 Calculator
34 Display
35 Keyboard (selection instruction receiving unit)
36 Mouse (selection instruction receiving unit)
37 Communication IF unit
38 Layout information storage (constitution information storage, layout information storage)
39 Initial value storage
40 Analysis history storage
50 Controller
51, 51a, 51b Drive controller
53 Motor connection detector
54 State storage
55 Direction setting information storage
57 Local communication unit
58 Setting value storage (local communication setting storage, motor connection information storage, timer value storage)
59 Program storage
60 Motor block
61 Motor
61a Rotor
62 Motor drive circuit
301 Transport controller
302 Report processor
303 Automatic corrector
304 Analysis history recording processor
CBL1, CBL2 Power source cable
CN1, CN2 Connector
D1, D2, D3, D4 Direction
H1, H2, H3 Hall effect element
M, M1 to M11 Conveyer module
Ms, Ms1, Ms2 Forward conveying module
Mt Direction changing module
P1 First program
P2 Second program
PS1, PS2 Power source
T1 to T7 Terminal
tin Carry-in timer value (timer value)
tin0 Initial carry-in timer value (initial timer value)
tj Jam determination time (timer value)
tj0 Initial jam determination time (initial timer value)
tlm Switch monitoring time (timer value)
tlm0 Initial switch monitoring time (initial timer value)
tout Carry-out timer value (timer value)
tout0 Initial carry-out timer value (initial timer value)
Vd Driving source voltage
W Conveyed object
Z, Z1 to Z11 Zone
ZC, ZC1 to ZC11 Local controller

What is claimed is:

1. A conveyer system comprising:
a conveyer device that includes a plurality of zones in a transport direction along which a conveyed object is transported, and a local controller provided in each of the zones for controlling a transport operation of the zone; and
a cause information report device that reports information relating to a cause of non-transport in at least one of the plurality of zones, wherein
the cause information report device include:
a selection instruction receiving unit that receives, from a user, a selection instruction for selecting one of the plurality of zones; and
a report processor that obtains, from the local controller of a target zone that is a zone selected in accordance with the selection instruction, information relating to a phenomenon that is a possible cause included in the cause of the non-transport of the conveyed object in the target zone as clue information, and reports, when the clue information satisfies a determination condition previously set, cause information that is the information relating to the cause based on the clue information.

2. The conveyer system according to claim 1, wherein
the plurality of zones include a plurality of types of the zones, which are different from one another,
the local controller includes:
a program storage for storing a program corresponding to a type, which is included in the types, of own zone to which the local controller belongs; and
a controller that executes the program stored in the program storage to control the transport operation of the own zone,
the report processor:
(a1) obtains, as the clue information, a type of the target zone and program identification information for identifying a program stored in a program storage of the target zone,
(a2) performs determination on a determination condition included in the determination condition previously set, in which correspondence between the type of the target zone obtained in (a1) and the program identified by the program identification information obtained in (a1) is inconsistent, and
(a3) reports, as the cause information, information relating to the program stored in the program storage of the target zone, when the determination condition is satisfied in (a2).

3. The conveyer system according to claim 1, wherein
the local controller includes:
a local communication unit provided with an address for identifying the local controller itself, and
a local communication setting storage that stores local address information indicating an address provided to a local communication unit of another zone adjacent to own zone to which the local controller belongs,
the local communication unit is communicable with a local communication unit of other zones included in the plurality of the zones based on the address indicated by the local address information
the cause information report device includes
a constitution information storage that stores layout information indicating layout of the zones and the addresses provided to the respective zones, the report processor:
(b1) obtains, as the clue information, the local address information stored in the local communication setting storage of the target zone and the layout information and the address of the zone, which are stored in the constitution information storage,
(b2) performs determination on a determination condition included in the determination condition previously set, in which the local address information obtained in (b1) is not matched with the layout information and the address of the zone, which are stored in the constitution information storage, and
(b3) reports, as the cause information, information relating to the local address information of the target zone, when the determination condition is satisfied in (b2).

4. The conveyer system according to claim 3, wherein the cause information report device
(b4) includes an automatic corrector that generates new local address information for the target zone based on the layout information and the address of the zone which are stored in the constitution information storage, when the determination condition is satisfied in (b2), to allow the new local address information to be stored in the local communication setting storage of the target zone as new local address information.

5. The conveyer system according to claim 1, wherein the local controller is communicable with a local controller of another zone adjacent to own zone to which the local controller belongs,
the report processor:
(c1) obtains, as the clue information, information indicating whether the local controller of the target zone performs normal communication with the local controller of the other zone adjacent to the target zone,
(c2) performing determination on a determination condition included in the determination condition previously set, in which the clue information obtained in (c1) indicates that the normal communication is not performed,
(c3) reports, as the cause information, information relating to communication of the local controller of the target zone, when the determination condition is satisfied in (c2).

6. The conveyer system according to claim 1, wherein each of the zones is provided with:
a motor that generates a driving force for the transport operation in the zone to which the motor belongs;
a plurality of connectors for connecting the motor;
a motor connection detector that detects presence/absence of connection of the motor to each of the connectors; and
a motor connection information storage that previously stores motor connection information indicating whether the motor is to be connected to the connector,
the report processor:
(d1) obtains, as the clue information, a result of detection by the motor connection detector of the target zone and the motor connection information stored in the motor connection information storage of the target zone,
(d2) performs determination on a determination condition included in the determination condition previously set, in which the motor connection information obtained in (d1) indicates that the motor should not be connected to a connector for which the result of the detection obtained in (d1) indicates presence of connection by the motor,
(d3) reports, as the cause information, information relating to the motor connection information for the target zone, when the determination condition is satisfied in (d2).

7. The conveyer system according to claim 1, wherein the local controller includes:
a timer value storage that stores a timer value used for controlling the transport operation,
the cause information report device includes
an initial value storage that previously stores an initial timer value that is an initial value of the timer value to be stored in the timer value storage of the local controller,
the report processor:
(e1) obtains, as the clue information, the timer value stored in the timer value storage of the target zone and the initial timer value stored in the initial value storage,
(e2) performs determination on a determination condition included in the determination condition previously set, in which the timer value of the target zone, which is obtained in (e1), and the initial timer value are not matched,
(e3) reports, as the cause information, information relating to the timer value of the target zone, when the determination condition is satisfied in (e2).

8. The conveyer system according to claim 7, wherein the cause information report device
(e4) includes an automatic corrector that allows the initial timer value stored in the initial value storage to be stored in the timer value storage of the target zone, as a new timer value, when the determination condition is satisfied in (e2).

9. The conveyer system according to claim 1, wherein the plurality of zones include a forward zone that allows the conveyed object to move straight, and a direction changing zone that allows the transport direction of the conveyed object to be changeable in a plurality of directions,
at least a local controller of the direction changing zone includes, at an inlet and an outlet for the conveyed object in own zone to which the local controller belongs, a direction setting information storage that stores direction setting information for setting whether the transport operation is performed,
the cause information report device includes a layout information storage that stores layout information indicating layout of each of the zones,
the report processor:
(f1) obtains, as the clue information, the direction setting information stored in the direction setting information storage of the target zone and the layout information stored in the layout information storage,
(f2) performs determination on a determination condition included in the determination condition previously set, in which the direction setting information and the layout information which are obtained in (f1) are not matched, and
(f3) reports, as the cause information, information relating to the direction setting information for the target zone, when the determination condition is satisfied in (f2).

10. The conveyer system according to claim 9, wherein the cause information report device
(f4) generates new direction setting information for the target zone based on the layout information stored in the layout information storage, when the determination condition is satisfied in (f2), to allow the new direction setting information to be stored in the local communication setting storage of the target zone as new direction setting information.

11. The conveyer system according to claim 1, wherein the local controller of each of the zones includes:
a state storage that stores permission information indicating presence/absence of carry-in permission of the conveyed object to another zone adjacent to own zone to which the local controller belongs at a downstream side in a transport direction, the carry-in permission being transmitted from the other zone,
the report processor:
(g1) obtains, as the clue information, the permission information stored in the state storage of the target zone,
(g2) performs determination on a determination condition included in the determination condition previously set, in which the permission information obtained in (g1) indicates absence of the permission,
(g3) reports, as the cause information, information relating to the permission information, when the determination condition is satisfied in (g2).

12. The conveyer system according to claim 1, wherein the local controller of each of the zones includes:
a state storage that stores request information indicating presence/absence of carry-out request of the conveyed object from another zone adjacent to own zone to which the local controller belongs at an upstream side in the transport direction, the carry-out request being transmitted from the other zone,
the report processor:
(h1) obtains, as the clue information, the request information stored in the state storage of the target zone,
(h2) performs determination on a determination condition included in the determination condition previously set, in which the request information obtained in (h1) indicates absence of the carry-out request,
(h3) reports, as the cause information, information relating to the request information, when the determination condition is satisfied in (h2).

13. The conveyer system according to claim 1, wherein the cause information report device includes an analysis history storage that associates the clue information obtained by the report processor with the determination result of the determination condition based on the clue information, and cumulatively stores the associated information.

14. A cause information report device that reports information relating to a cause of non-transport in at least one of a plurality of zones, the plurality of zones being included in a conveyer device in a transport direction along which a conveyed object is transported, the conveyer device further including a local controller provided in each of the zones for controlling the transport operation of the zone;
the cause information report device comprising:
a selection instruction receiving unit that receives, from a user, a selection instruction for selecting one of the plurality of zones; and
a report processor that obtains, from the local controller of a target zone that is a zone selected by the selection instruction, information relating to a phenomenon that is a possible cause included in the cause of the non-transport of the conveyed object in the target zone as clue information, and reports, when the clue information satisfies a determination condition previously set, cause information that is the information relating to the cause based on the clue information.

15. A computer readable recording medium that records a program for a cause information report device that reports information relating to a cause of non-transport in at least one of a plurality of zones, the plurality of zones being included in a conveyer device in a transport direction along which a conveyed object is transported, the conveyer device further including a local controller provided in each of the zones for controlling the transport operation of the zone;
the program causing a computer to function as:
a selection instruction receiving unit that receives, from a user, a selection instruction for selecting one of the plurality of zones; and
a report processor that obtains, from the local controller of a target zone that is a zone selected by the selection instruction, information relating to a phenomenon that is a possible cause included in the cause of the non-transport of the conveyed object in the target zone as clue information, and reports, when the clue information satisfies a determination condition previously set, cause information that is the information relating to the cause based on the clue information.

* * * * *